US007966567B2

(12) United States Patent
Abhyanker

(10) Patent No.: US 7,966,567 B2
(45) Date of Patent: Jun. 21, 2011

(54) CHARACTER EXPRESSION IN A GEO-SPATIAL ENVIRONMENT

(75) Inventor: Raj Vasant Abhyanker, Cupertino, CA (US)

(73) Assignee: Center'd Corp., Menlo Park, CA (US)

( * ) Notice: Subject to any disclaimer, the term of this patent is extended or adjusted under 35 U.S.C. 154(b) by 1012 days.

(21) Appl. No.: 11/827,936

(22) Filed: Jul. 12, 2007

(65) Prior Publication Data

US 2009/0019366 A1 Jan. 15, 2009

(51) Int. Cl.
G06F 3/048 (2006.01)
G06F 3/00 (2006.01)
G06F 17/30 (2006.01)

(52) U.S. Cl. ........ 715/757; 715/706; 715/758; 715/764; 715/765; 715/848; 715/849; 726/26

(58) Field of Classification Search .................. 715/757, 715/706, 758, 764, 765, 848, 849; 726/26
See application file for complete search history.

(56) References Cited

U.S. PATENT DOCUMENTS

| | | | | |
|---|---|---|---|---|
| 2004/0030741 | A1* | 2/2004 | Wolton et al. | 709/202 |
| 2004/0179037 | A1 | 9/2004 | Blattner et al. | |
| 2004/0179038 | A1 | 9/2004 | Blattner et al. | |
| 2004/0179039 | A1 | 9/2004 | Blattner et al. | |
| 2004/0221224 | A1 | 11/2004 | Blattner et al. | |
| 2005/0022134 | A1* | 1/2005 | Tokashiki | 715/764 |
| 2005/0137015 | A1* | 6/2005 | Rogers et al. | 463/42 |
| 2005/0143174 | A1* | 6/2005 | Goldman et al. | 463/42 |
| 2007/0113181 | A1 | 5/2007 | Blattner et al. | |
| 2007/0168863 | A1 | 7/2007 | Blattner et al. | |
| 2007/0233291 | A1* | 10/2007 | Herde et al. | 700/91 |
| 2007/0233367 | A1* | 10/2007 | Chen et al. | 701/207 |
| 2008/0020814 | A1* | 1/2008 | Kernene | 463/10 |
| 2008/0148156 | A1* | 6/2008 | Brewer et al. | 715/738 |
| 2008/0215994 | A1* | 9/2008 | Harrison et al. | 715/757 |
| 2008/0229424 | A1* | 9/2008 | Harris et al. | 726/26 |

OTHER PUBLICATIONS

Wallop is the exclusive on-line social experience where it's easy to be yourself and connect with the friends you choose!, http://www.wallopcorp.com/, Dec. 11, 2006.
Cyworld—Create. Share. Show off., http://us.cyworld.com/, copyright 2006-2007.
zooped.com, http://www.zooped.com/index.php, copyright 2006.
Myspace.com, http://www.myspace.com/Modules/Help/Pages/HelpCenter.aspx?Category=4&Question=7, copyright 2003-2007.
Ning—Create Your Own Social Network for Anything, http://www.ning.com/about/features.html, copyright 2007.

* cited by examiner

*Primary Examiner* — Weilun Lo
*Assistant Examiner* — Shashi K Becker
(74) *Attorney, Agent, or Firm* — David Xue; Goodwin Procter LLP

(57) ABSTRACT

A method, apparatus and system of character expression in a geo-spatial environment are disclosed. In one embodiment, a method includes generating a community network of user profiles, each user profile associated with a specific geographic location, associating a first user with a first user profile, providing a first character expression associated with the first user profile, generating a first display view to include a three-dimensional map view embodied by the community network, the first character expression, and the first user profile represented at a location in the three-dimensional map view associated with the specific geographic location of the first user profile, and simultaneously representing other user profiles adjacent to the first user profile in the three-dimensional map view. The method may also include providing elements as a part of a commerce transaction and enabling the commerce transaction via a user profile.

36 Claims, 17 Drawing Sheets

| USERS 1402 | CLAIMED PROFILE 1404 | CHARACTER EXPRESSION 1406 | CUSTOMIZED HOMEPAGE 1408 | INCENTIVES 1410 |
|---|---|---|---|---|
| JANE DOE | YES | NO | YES | 1 |
| JIM SLIM | YES | NO | NO | 0 |
| HARRY CARY | NO | YES | NO | 0 |
| ... | ... | ... | ... | ... |

CHARACTER EXPRESSION IN A GEO-SPATIAL ENVIRONMENT

FIELD OF TECHNOLOGY

This disclosure relates generally to the technical fields of communications and in one example embodiment, to a method, apparatus, and system of character expression in a geo-spatial environment.

BACKGROUND

Character expression may generally refer to expressions of personality through symbolic representation. The representations may be expressed in various ways such as through original works of art and/or may be provided in various forums. For example, an individual may create avatars in a personal space in an Internet forum.

The individual, however, may wish to incorporate aspects of his/her life that go beyond his/her personality into a real world expression. For example, the individual may place significance on aspects of his/her life related to his/her community. The individual may wish to express his/her personality in context of his/her community.

Additionally, the individual may wish to get to know members of his/her community (e.g., their neighbors) and may want to learn more about their personalities. The individual may seek out each neighbor and may decide to spend time with each neighbor in an effort to get to know them. Such efforts may prove time-consuming and cumbersome or may fail altogether due to an inability to actually contact the neighbor, scheduling conflicts, etc.

SUMMARY

A method, apparatus and system of character expression in a geo-spatial environment are disclosed. In one aspect, a method includes generating a community network of user profiles, each user profile associated with a specific geographic location, associating a first user with a first user profile, providing a first character expression associated with the first user profile, generating a first display view to include a three-dimensional map view embodied by the community network, the first character expression, and the first user profile represented at a location in the three-dimensional map view associated with the specific geographic location of the first user profile, and simultaneously representing other user profiles adjacent to the first user profile in the three-dimensional map view.

The providing the first character expression associated with the first user profile may further include providing a representation of a physical space and/or an avatar, and enabling decoration of a representation as an expression of an individual. The representation of a physical space may be selected from a group including a representation of an outdoor space and/or a representation of an indoor space (e.g., may include a three-dimensional representation of a room), etc.

In addition, the enabling decoration of the three-dimensional representation of a room as an expression of an individual may include enabling decoration with representation of an element selected from a group including physical object, color, pattern, background, furnishing, person, avatar, artwork, diploma, work accomplishment document, trophy, poster, picture, and/or photograph, etc. The representation of an outdoor space may also include a three-dimensional representation of a garden, a park, and/or an outdoor venue, etc.

In addition, the enabling decoration of the three-dimensional representation of a garden, a park, and/or an outdoor venue may include enabling decoration with representation of an element selected from a group including physical object, color, pattern, background, flower, plant, tree, sky, cloud, sun, rainbow, body of water, person, avatar, animal, physical structure, and/or transportation vehicle, etc.

The enabling decoration of the avatar may include enabling decoration of an element selected from a group including physical characteristic, personal feature, facial expression, physical pose, clothing item, and/or accessory, etc. The method may further include providing character expression tools to customize the first character expression. The method may also include providing elements as a part of a commerce transaction, and enabling the commerce transaction via a user profile.

The method may yet include enabling creation of a second character expression (e.g., may be displayed in conjunction with a wiki profile) associated with a second user profile, generating a second display view to include a three-dimensional map view embodied by the community network, the second character expression, and the second user profile represented at a location in the three-dimensional map view associated with the specific geographic location of the second user profile, and simultaneously representing other user profiles adjacent to the second user profile in the three-dimensional map view.

In addition, the method may include providing a first incentive associated with the creation of the second character expression. The method may further include providing a second incentive associated with generation of an invitation to claim the second user profile, and generating the invitation. The method may also include providing a third incentive associated with a claimed second user profile. The method may yet include generating a homepage associated with the first user profile. The method may include providing homepage tools to customize the homepage.

In another aspect, a system includes a geo-spatial environment, a community network module of the geo-spatial environment, to include user profiles (e.g., each user profile to include a specific geographic location), a character expression module of the geo-spatial environment to generate character expressions associated with the user profiles, a map module of the geo-spatial environment to include map data which serves as a basis to render a three-dimensional map view in the geo-spatial environment which identifies residences, businesses, and/or civic structures having specific geographic locations, and a display module of the geo-spatial environment to generate a display view of the three-dimensional map view embodied by the community network, a first user profile, and a first character expression associated with the first user profile represented at a location in the three-dimensional map view associated with the specific geographic location of the first user profile, and simultaneously to represent other user profiles adjacent to the first user profile in the three-dimensional map view.

The system may further include a wiki profile module of the geo-spatial environment to generate in the display view a wiki profile associated with a user profile. The system may also include an append module to generate, with the wiki profile, content associated with the wiki profile. In addition, the system may include an incentive module of the geo-spatial environment to enable creation of a second character expression associated with a second user profile, display of the second character expression in conjunction with the wiki profile associated with the second user profile, and incentives associated with the creation of the second character expression, generation of an invitation to claim the second user profile, and/or a claim of the second user profile.

The system may yet include a character expression tool module of the geo-spatial environment to customize a character expression of the character expressions associated with the user profile. The system may further include an element module of the geo-spatial environment to provide elements to customize the character expression. The character expression may further include a representation of an indoor space (e.g., may include a three-dimensional representation of a room), a representation of an outdoor space (e.g., may include a three-dimensional representation of a garden, a park, and/or an outdoor venue), and/or an avatar.

The elements to customize the three-dimensional representation of a room may be selected from a group including physical object, color, pattern, background, furnishing, person, avatar, artwork, diploma, work accomplishment document, trophy, poster, picture, and/or photograph, etc. Moreover, the elements to customize the three-dimensional representation of a garden, a park, and/or an outdoor venue may be selected from a group including physical object, color, pattern, background, flower, plant, tree, sky, cloud, sun, rainbow, body of water, person, avatar, animal, physical structure, and/or transportation vehicle, etc.

In addition, the elements to customize the avatar may be selected from a group including physical characteristic, personal feature, facial expression, physical pose, clothing item, and/or accessory, etc. The system may further include a commerce transaction module of the geo-spatial environment to generate a commerce transaction (e.g., may include an online payment transaction to purchase a use of elements in the character expression) associated with the character expression. The system may further include a homepage module of the geo-spatial environment to generate a homepage associated with the first user profile. The system may yet include a homepage tool module to provide homepage tools to customize the homepage.

In yet another aspect, a geo-spatial environment includes a first instruction set to enable a community network, to include a map database associated with map data and a user database associated with user profiles (e.g., each user profile associated with a specific geographic location identifiable in the map data), a second instruction set integrated with the first instruction set to generate a character expression associated with a first user profile (e.g., the first user profile may be displayed at a location in the three-dimensional map view associated with the specific geographic location of the first user profile), and a third instruction set integrated with the first instruction set and the second instruction set to display a three-dimensional map view embodied by the community network, the first user profile, the character expression, and simultaneously to represent other user profiles adjacent to the first user profile in the three-dimensional map view.

Additionally, the geo-spatial environment may include a fourth instruction set integrated with the first instruction set, the second instruction set and the third instruction set to provide elements and character expression tools to customize character expressions. The geo-spatial environment may also include a fifth instruction set to enable creation and customization of a homepage associated with a user profile.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 14 is a table view displaying information associated with the user profiles of the users, according to one embodiment.

Figure 1:
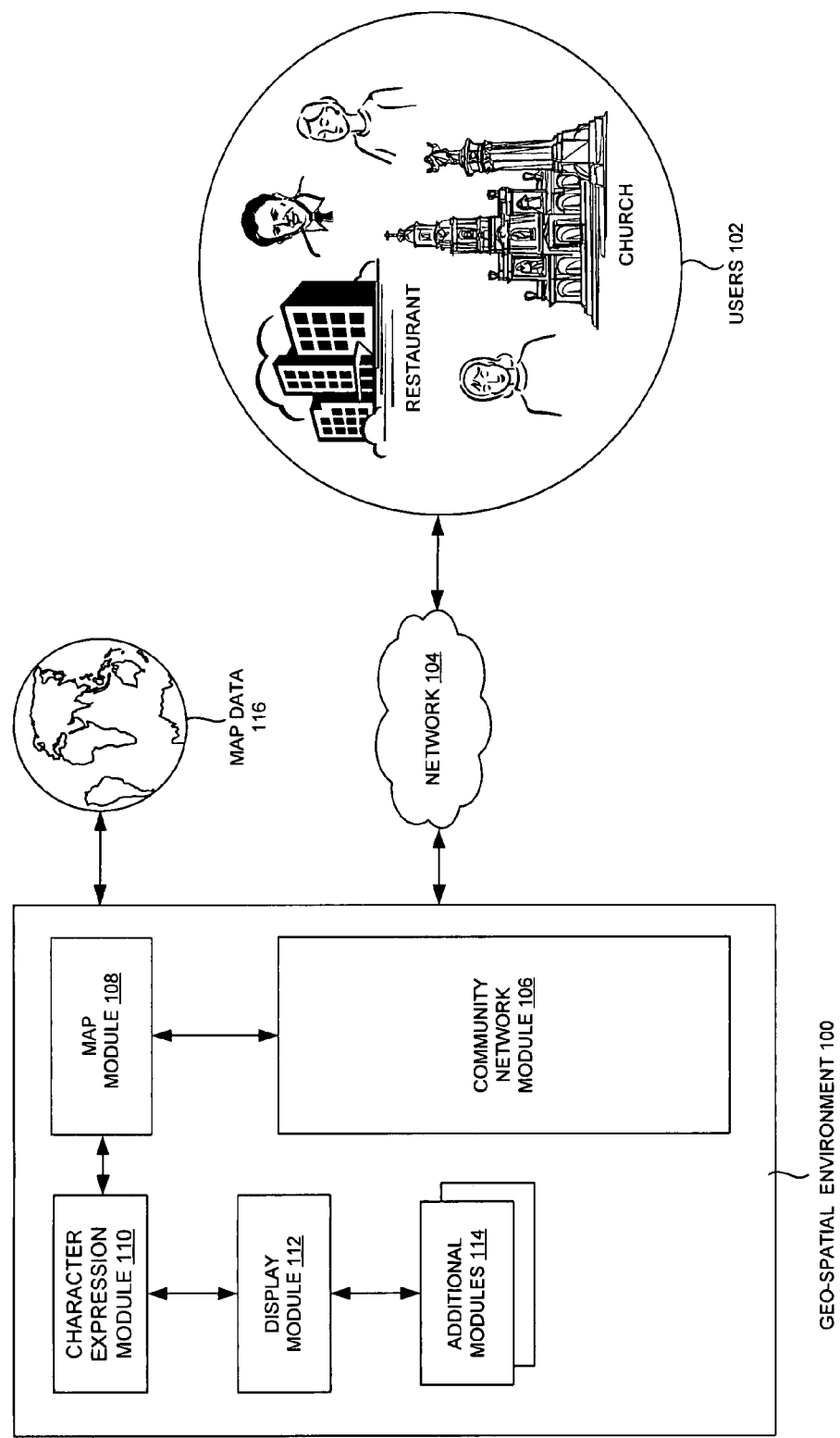
FIG. 1 is a system view of a geo-spatial environment communicating with users through a network, according to one embodiment.

Other features of the present embodiments will be apparent from the accompanying drawings and from the detailed description that follows.

DETAILED DESCRIPTION

A method, apparatus and system of character expression in a geo-spatial environment are disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method includes generating a community network (e.g., the community network 200 of FIG. 2) of user profiles (e.g., the user profiles 204 of FIG. 2-4 associated with the users 102 of FIG. 1), each user profile 204 associated with a specific geographic location (e.g., the specific geographic location 206 of FIG. 2), associating a first user (e.g., of the users 102 of FIG. 1) with a first user profile (e.g., the first user profile 204A illustrated in FIG. 4), and providing a first character expression (e.g., the character expression 422 of FIG. 4) associated with the first user profile 204A.

The method also includes generating a first display view (e.g., the first display view 402 of FIG. 4) to include a three-dimensional map view (e.g., the three-dimensional map view 420 of FIG. 4) embodied by the community network 200, the first character expression 422, and the first user profile 204A represented at a location in the three-dimensional map view 420 associated with the specific geographic location 206 of the first user profile 204A, and simultaneously representing other user profiles (e.g., the other user profiles 204B of FIG. 4) adjacent to the first user profile 204A in the three-dimensional map view 420.

In another embodiment, a system includes a geo-spatial environment (e.g., the geo-spatial environment 100 of FIG. 1), a community network module 106 of the geo-spatial environment 100, to include user profiles 204, each user profile 204 to include a specific geographic location 206, and a character expression module (e.g., the character expression module 110 of FIG. 1) of the geo-spatial environment 100 to generate character expressions 422 associated with the user profiles 204, The system also includes a map module 108 of the geo-spatial environment 100 to include map data 116 which serves as a basis to render a three-dimensional map view 420 in the geo-spatial environment 100 which identifies some residences, businesses, and/or civic structures having the specific geographic location 206, and a display module (e.g., the display module 112 of FIG. 1) of the geo-spatial environment 100 to generate a display view 402 of the three-dimensional map view 420 embodied by the community network 200, a first user profile 204A, and a first character expression 422 associated with the first user profile 204A represented at a location in the three-dimensional map view 420 associated with the specific geographic location 206 of the first user profile 204A, and simultaneously to represent other user profiles 204B adjacent to the first user profile 204A in the three-dimensional map view 420.

In yet another embodiment, a geo-spatial environment 100 includes a first instruction set to enable a community network 200, to include a map database (e.g., the map database 208 of FIG. 2) associated with the map data 116 and a user database (e.g., the user database 202 of FIG. 2) associated with user profiles 204, each user profile 204 associated with a specific geographic location 206 identifiable in the map data 116, a second instruction set integrated with the first instruction set to generate a character expression 422 associated with a first user profile 204A (e.g., the first user profile 204A may be displayed at a location in a three-dimensional map view 420 associated with the specific geographic location 206 of the first user profile 204A) and a third instruction set integrated with the first instruction set and the second instruction set to display the three-dimensional map view 420 embodied by the community network 200, the first user profile 204A, the character expression 422, and simultaneously to represent other user profiles 204B adjacent to the first user profile 204A in the three-dimensional map view 420.

FIG. 1 is a system view of a geo-spatial environment 100 communicating with users 102 through a network 104, according to one embodiment. Particularly, FIG. 1 illustrates the geo-spatial environment 100, the users 102, the network 104, a community network module 106, a map module 108, a character expression module 110, a display module 112, additional modules 114 and a map data 116, according to one embodiment.

The geo-spatial environment 100 may enable creation of a character expression (e.g., the character expression 422 of FIG. 4) to express oneself through symbolic representation in a community network 200. The users 102 may be individuals having user profiles (e.g., the user profiles 204 of FIG. 2-4) associated with specific geographic locations 206 in the geo-spatial environment 100. The network 104 may enable the users 102 to communicate with the geo-spatial environment 100. The community network module 106 may include user profiles 204 associated with a specific geographic location 206 in the geo-spatial environment 100.

The map module 108 may process (e.g., provide, store, generate, render, etc.) a three-dimensional map view 420 in the geo-spatial environment 100, concurrently displaying the specific geographic location 206 associated with residence, business and/or civic structures using the map data 116. The character expression module 110 may generate the character expressions 422 to represent a physical space and/or an avatar (e.g., the avatar 606 of FIG. 6) associated with the user profiles 204 in the geo-spatial environment 100. In addition, the character expression module 110 may enable decoration of a representation of a physical space and/or an avatar 606 using elements 408 (e.g., physical object, color, pattern, and/or rainbow, etc).

The display module 112 may display the character expressions 422 associated with the user profiles 204 having the specific geographic location 206. The additional modules 114 may generate additional processes to enable creation of character expressions 422 associated with wiki profiles (e.g., the wiki profile 416 of FIG. 4). The map data 116 may be information associated with the user 102 that serves as a basis to identify a specific geographic location 206 associated with residences, businesses and/or civic structures displayed in the three-dimensional map view 420.

In the example embodiment illustrated in FIG. 1, the geo-spatial environment 100 communicates with the users 102 through the network 104. In addition, the geo-spatial environment 100 communicates with the map data 116. The geo-spatial environment 100 includes the community network module 106, the map module 108, the character expression module 110, the display module 112 and the additional modules 114, communicating with each other.

The community network module 106 of the geo-spatial environment 100 may include the user profiles 204 (e.g., each user profile to include the specific geographic location 206). The character expression module 110 of the geo-spatial environment 100 may generate the character expressions 422 associated with the user profiles 204. The map module 108 of the geo-spatial environment 100 may include the map data 116 which serves as a basis to render the three-dimensional map view 420 in the geo-spatial environment 100 which identifies some residences, businesses, and/or civic structures having specific geographic locations 206.

The display module 112 of the geo-spatial environment 100 may generate a display view 402 of the three-dimensional map view 420 embodied by the community network 200, a first user profile 204A, and a first character expression 422 associated with the first user profile 204A represented at a location in the three-dimensional map view 420 associated with the specific geographic location 206 of the first user profile 204A, and simultaneously to represent other user profiles 204B adjacent to the first user profile 204A in the three-dimensional map view 420.

The first character expression 422 associated with the first user profile 204A may be provided (e.g., using the character expression module 110 of FIG. 1). For example, providing the first character expression 422 associated with the first user profile 204A may include providing a representation of a physical space and/or an avatar 606 and enabling decoration of the representation as an expression of an individual. In addition, the enabling decoration of the avatar 606 may include enabling decoration with an element (e.g., physical characteristic, personal feature, facial expression, physical pose, clothing item, and/or accessory, etc.).

In addition, the representation of a physical space may be selected from a group including a representation of an outdoor space and/or a representation of an indoor space, etc. For example, the representation of an indoor space may include a three-dimensional representation of a room (e.g., the character expression 422 illustrated in FIG. 5). The enabling decoration of the three-dimensional representation of a room as an expression of an individual may include enabling decoration with a representation of an element (e.g., physical object, color, pattern, background, furnishing, person, avatar, artwork, diploma, work accomplishment document, trophy, poster, picture, and/or photograph).

The representation of an outdoor space may include any one of a three-dimensional representation of a garden, a park, and/or an outdoor venue. For example, the enabling decoration of the three-dimensional representation of a garden, a park, and/or an outdoor venue may include enabling decoration with representation of an element 408 (e.g., physical object, color, pattern, background, flower, plant, tree, sky, cloud, sun, rainbow, body of water, person, avatar, animal, physical structure, and/or a transportation vehicle, etc.).

The geo-spatial environment 100 includes a first instruction set (e.g., software, code, program, commands, etc.) to enable the community network 200, to include the map database 208 associated with the map data 116 and the user database 202 associated with user profiles 204, each user profile 204 associated with the specific geographic location 206 identifiable in the map data 116. The geo-spatial environment 100 includes a second instruction set integrated with the first instruction set to generate the character expression 422 associated with the first user profile 204A.

The geo-spatial environment 100 includes a third instruction set integrated with the first instruction set and the second instruction set to display the three-dimensional map view 420 embodied by the community network 200, the first user profile 204A (e.g., the first user profile 204A may be displayed at a location in the three-dimensional map view 420 associated with the specific geographic location 206 of the first user profile 204A), the character expression 422, and simultaneously to represent other user profiles 204B adjacent to the first user profile 204A in the three-dimensional map view 420.

The geo-spatial environment 100 may include a fourth instruction set integrated with the first instruction set, the second instruction set and the third instruction set to provide elements 408 and/or character expression tools 406 to customize character expressions 422. The geo-spatial environment 100 may include a fifth instruction set to enable creation and/or customization of a homepage (e.g., the homepage 404 of FIG. 4) associated with a user profile 204.

Figure 2:
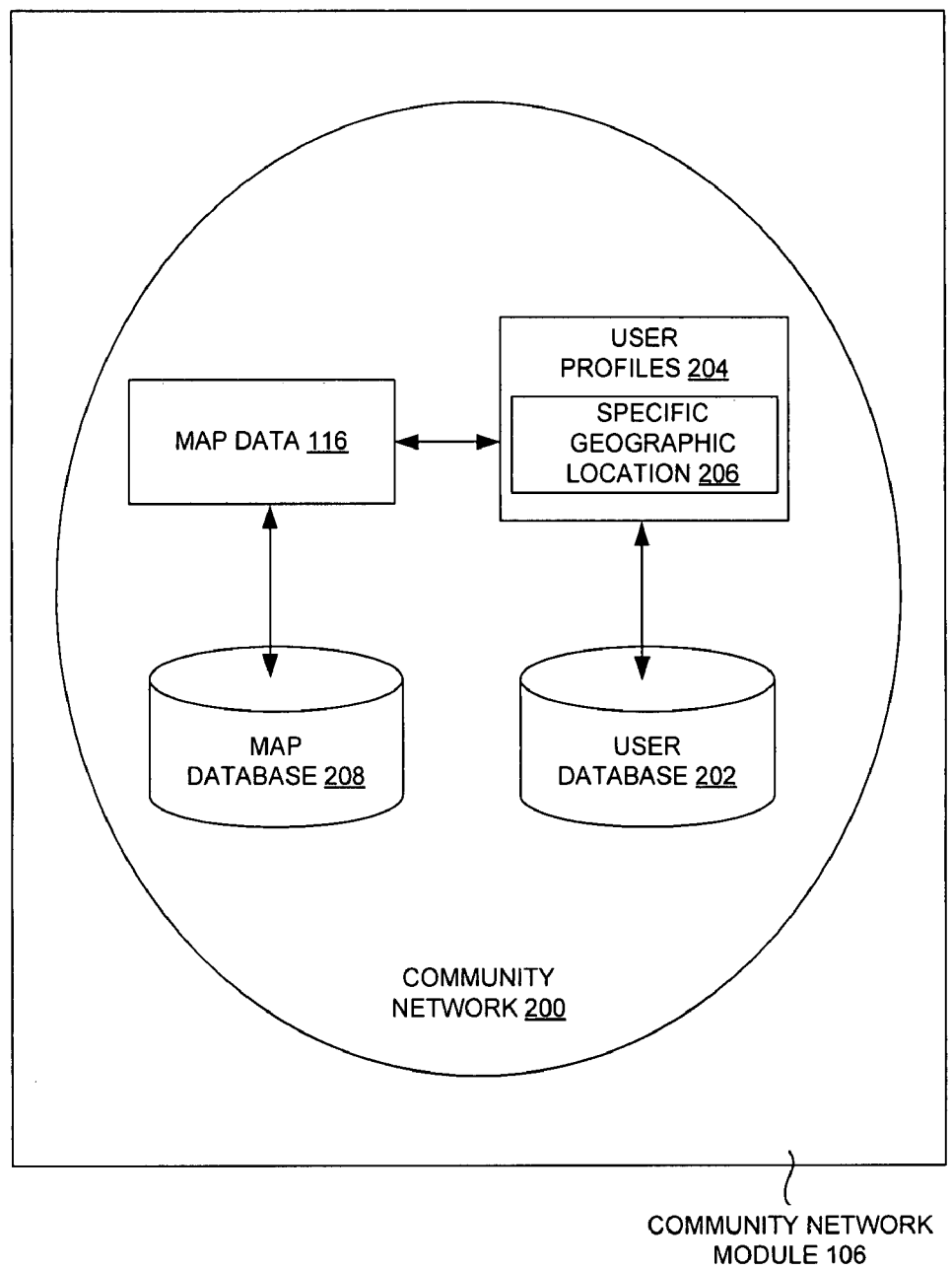
FIG. 2 is an exploded view of the community network module of FIG. 1, according to one embodiment.

FIG. 2 is an exploded view of the community network module 106 of FIG. 1, according to one embodiment. Particularly, FIG. 2 illustrates the map data 116, a community network 200, a user database 202, user profiles 204, a specific geographic location 206 and a map database 208, according to one embodiment.

The community network 200 may be a network formed by the users 102 having the user profiles 204 in the geo-spatial environment 100. The user database 202 may include profile information (e.g., name, age, address, etc.) of the users 102 in the community network 200. The user profiles 204 may include information associated with a specific geographic location 206 identifiable through map data 116. For example, the specific geographic location 206 may be a location (e.g., displayed in the three-dimensional map view 420 to represent the user profiles 204) associated with address data of the user profiles 204 in the geo-spatial environment 100. The map database 208 may include map data 116 used to identify specific geographic locations 206 associated with the user profiles 204.

In the example embodiment illustrated in FIG. 2, the community network module 106 includes the community network 200. The community network 200 consists of the user database 202 that includes the user profiles 204 and the map database 208 including the map data 116 associated with the specific geographic location 206. The community network 200 of the user profiles 204 may be generated (e.g., using the community network module 106 of FIG. 1) in which each user profile 204 is associated with the specific geographic location 206.

Figure 3:
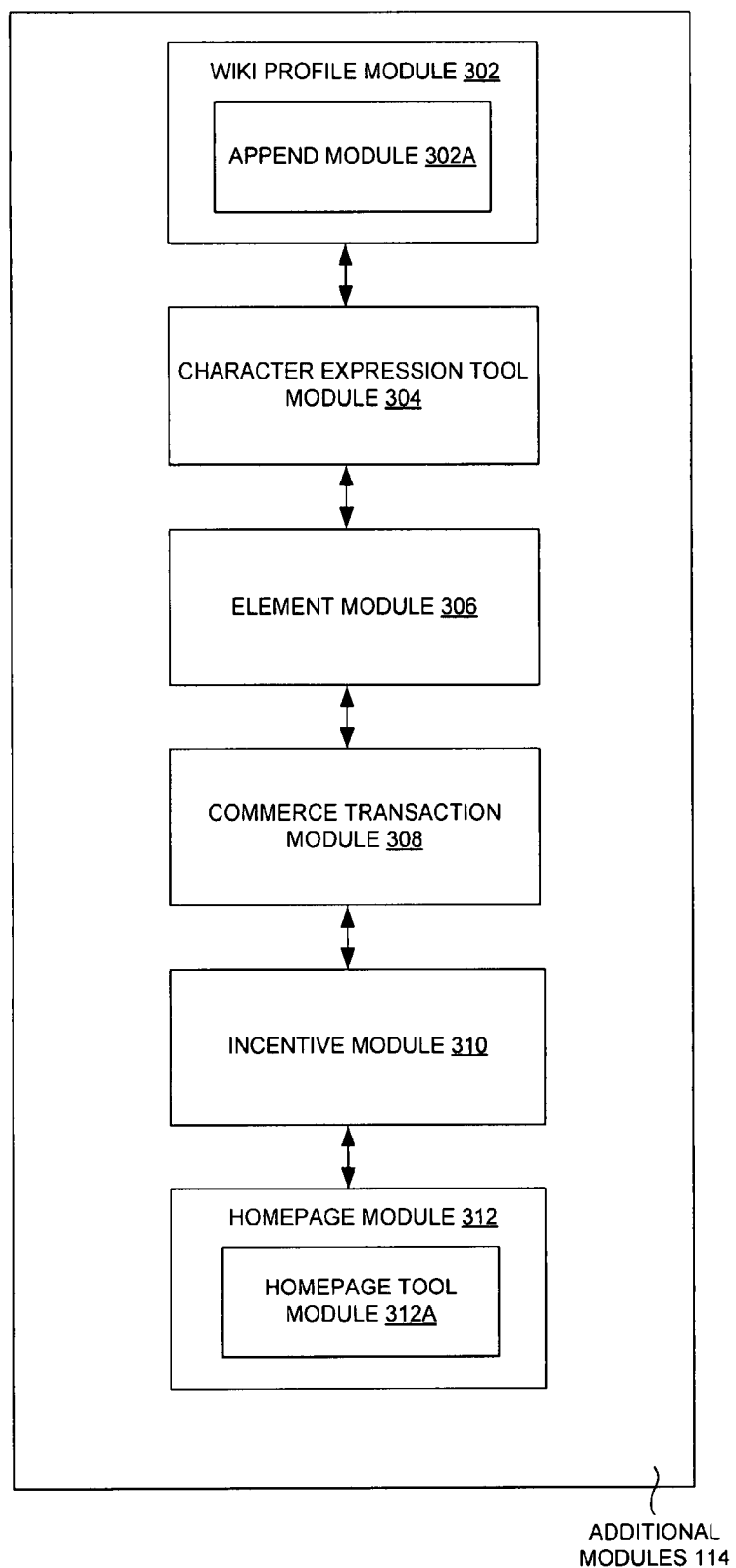
FIG. 3 is an exploded view of the additional modules of FIG. 1, according to one embodiment.

FIG. 3 is an exploded view of the additional modules 114 of FIG. 1, according to one embodiment. Particularly, FIG. 3 illustrates a wiki profile module 302, an append module 302A, a character expression tool module 304, an element module 306, a commerce transaction module 308, an incentive module 310, a homepage module 312 and a homepage tool module 312A, according to one embodiment.

The wiki profile module 302 may generate a wiki profile (e.g., the wiki profile 416 of FIG. 4) associated with a user profile 204 in a three-dimensional map view 420. The append module 302A may generate content 418 associated with the wiki profiles 416 (e.g., displayed in the three-dimensional map view 420). The character expression tool module 304 may enable customizing of a character expression 422 associated with the user profile 204 in the geo-spatial environment 100.

The element module 306 may provide elements (e.g., the elements 408 of FIG. 4) for the users 102 to customize the character expression 422 in the geo-spatial environment 100. For example the elements 408 (e.g., color, pattern, flower, avatar, physical structure, transportation vehicle, and/or picture, etc.) may be used to decorate a representation of a physical space and an avatar 606. The commerce transaction module 308 may generate a commerce transaction 424 (e.g., an online purchase) associated with the character expression 422 where the users 102 can choose to buy the elements 408 (e.g., representations of wallpaper, background, banners, fonts, artwork, poster, picture, photograph, etc.).

The incentive module 310 may enable users 102 to obtain different levels of incentives 410 associated with the character expression 422. For example, the user 102 may obtain a first level of incentive 410 for creating the character expression 422, a second level of incentive 410 for sending invitations to others to claim a profile and a third level of incentive 410 when other users 102 claim a profile 204. The homepage module 312 may generate a homepage (e.g., the homepage 404 of FIG. 4) associated with the user profile 204 of the user 102. The homepage tool module 312A may provide homepage tools 414 to customize the homepage 404.

In the example embodiment illustrated in FIG. 3, the additional modules 114 include the wiki profile module 302, the character expression tool module 304, the element module 306, the commerce transaction module 308, the incentive module 310, the homepage module 312 interacting with each other. In addition, the wiki profile module 302 includes the append module 302A and the homepage module 312 includes the homepage tool module 312A.

Figure 4:
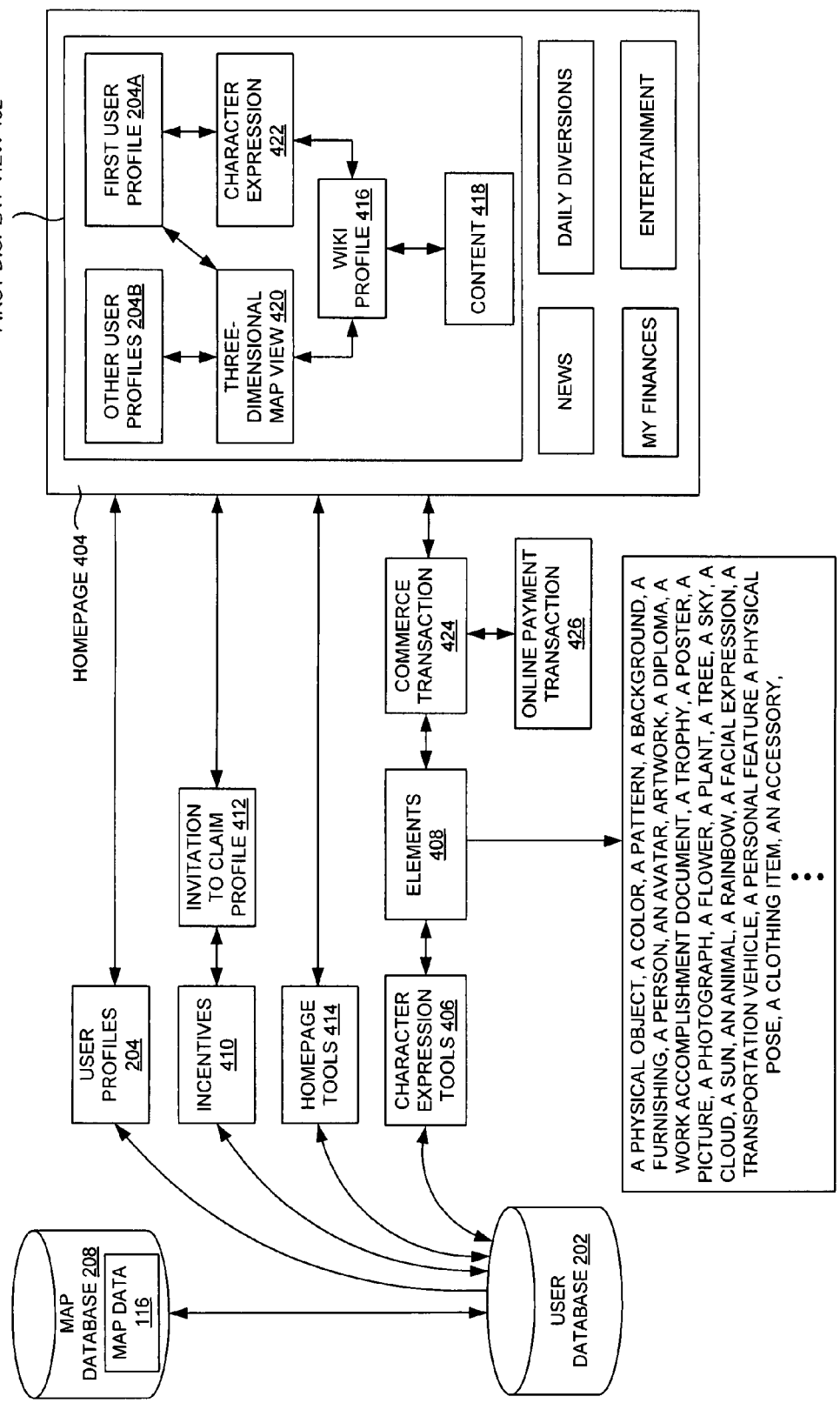
FIG. 4 is a block diagram illustrating generation of a character expression associated with a first user profile, according to one embodiment.

The wiki profile module 302 of the geo-spatial environment 100 may generate, in the display view 402, a wiki profile (e.g., a publicly editable wiki profile 416 as illustrated in FIG. 4) associated with the user profile 204. The append module 302A may generate, with the wiki profile 416, content 418 associated with the wiki profile 416. The incentive module 310 of the geo-spatial environment 100 may enable creation of a second character expression 422 associated with a second user profile 204, display of the second character expression 422 in conjunction with the wiki profile 416 associated with the second user profile 204, and incentives 410 associated with the creation of the second character expression 422, generation of an invitation (e.g., through the invitation option 906 of FIG. 9) to claim the second user profile 204.

The character expression tool module 304 of the geo-spatial environment 100 may customize the character expression 422 (e.g., representing the indoor space, the outdoor space, and/or the avatar) associated with the user profile 204. The element module 306 of the geo-spatial environment 100 may provide elements 408 to customize the character expression 422.

For example, the character expression 422 may include the representation of an indoor space, the representation of an outdoor space and/or the avatar 606. The representation of an indoor space may include the three-dimensional representation of a room (e.g., the character expression 422 of FIG. 5). For example, the elements 408 to customize the representation of a room may be selected from a group including physical object, color, pattern, background, furnishing, person, avatar, artwork, diploma, work accomplishment document, trophy, poster, picture, and/or photograph, etc. In addition, the representation of an outdoor space may include the three-dimensional representation of a garden, a park, and/or an outdoor venue.

For example, the elements 408 to customize the three-dimensional representation of a garden, a park, and/or an outdoor venue may be selected from a group (e.g., including physical object, color, pattern, background, flower, plant, tree, sky, cloud, sun, rainbow, body of water, person, avatar, animal, physical structure, and/or transportation vehicle, etc).

In addition, the elements 408 to customize the avatar 606 may be selected from the group including physical characteristics, personal features, facial expressions, physical poses, clothing items, and/or accessories, etc. The commerce transaction module 308 of the geo-spatial environment 100 may generate a commerce transaction 424 (e.g., may include an online payment transaction 426 to purchase a use of elements 408) associated with the character expression 422. The homepage module 312 of the geo-spatial environment 100 may generate a homepage (e.g., the homepage 404 of FIG. 4) associated with the user profile 204 of the user 102. The homepage tool module 312A may provide homepage tools 414 to customize the homepage 404.

Creation of a second character expression 422 associated with a second user profile 204 may be enabled (e.g., using the character expression module 110 of FIG. 1). A second display view 402 may be generated (e.g., using the display module 112 of FIG. 1) to include the three-dimensional map view 420 embodied by the community network 200, the second character expression 422 (e.g., may be displayed in conjunction with the wiki profile 416), and the second user profile 204 represented at a location (e.g., associated with the specific geographic location 206 of the second user profile 204) in the three-dimensional map view 420. The other user profiles 204B adjacent to the second user profile 204 may be represented (e.g., using the display module 112 of FIG. 1) simultaneously in the three-dimensional map view 420.

A first incentive associated with the creation of the second character expression 422 may be provided (e.g., through the incentive module 310 of FIG. 3). A second incentive associated with generation of the invitation may be provided to claim the second user profile 204. For example, an invitation may be generated using the incentive options 904 of FIG. 9. A third incentive associated with a claimed second user profile 204 may be provided (e.g., using the incentive module 310 of FIG. 3).

The homepage 404 associated with the first user profile 204A may be generated (e.g., using the homepage module 312 of FIG. 3) and/or the homepage tools 414 may be provided (e.g., using the homepage tool module 312A of FIG. 3) to customize the homepage 404.

FIG. 4 is a block diagram 400 illustrating generation of a character expression 422 associated with the first user profile 204A, according to one embodiment. Particularly, FIG. 4 illustrates the map data 116, the user database 202, the user profiles 204, the first user profile 204A, the other user profiles 204B, the map database 208, a first display view 402, a homepage 404, character expression tools 406, elements 408, incentives 410, a invitation to claim profile 412, homepage tools 414, a wiki profile 416, a content 418, a three-dimensional map view 420, a character expression 422, a commerce transaction 424 and an online payment transaction 426, according to one embodiment.

The first display view 402 may display the character expression 422 of the first user profile 204A represented at the location along with the three-dimensional map view 420 associated with the specific geographic location 206. The homepage 404 may display the character expression 422 associated with the first user profile 204A and the other user profiles 204B. The character expression tools 406 may be used to select elements 408.

The elements 408 may be a part of the commerce transaction 424 available for the users 102 to customize a character expression 422. The incentives 410 may be rewards and/or remuneration provided to the users 102 for creating the character expression 422 for wiki profiles 416, sending invitations to others to claim their profile upon receiving the invitation etc.

The invitation to claim profile 412 may enable the users 102 to send invitations to others to claim the profile. The homepage tools 414 may be used to customize the homepage 404. The wiki profile 416 may be a profile associated with individuals who have not claimed their profile. The content 418 may include data associated with the wiki profile 416. The three-dimensional map view 420 may display the user profile 204 along with the adjacent user profiles 204 in the specific geographic location 206.

The character expression 422 may generally refer to expressions of personality, the representation of a physical space (e.g., may be the representation of an indoor space and the representation of an outdoor space), and the avatar 606 associated with the user profiles 204 through symbolic representation in the geo-spatial environment 100. The commerce transaction 424 may enable the users 102 to purchase elements 408 (e.g., representations of wallpaper, furnishing, background, banners, fonts, artwork, poster, picture, photograph etc.) associated with the character expression 422 through online payment transaction 426. The online payment transaction 426 may enable the users 102 to purchase elements 408 online for creating the character expression 422.

In the example embodiment illustrated in FIG. 4, the user database 202 provides the data sources to the homepage 404 through the character expression tools 406, the elements 408 (e.g., physical object, color, pattern, background, furnishing, etc.), the incentives 410, the invitation to claim profile 412, the homepage tools 414, the commerce transaction 424 and the online payment transaction 426. The homepage 404 may include the first display view 402 that displays news, daily diversions, entertainment and/or my finances. The first display view 402 may further include first user profile 204A, the other user profiles 204B, the wiki profile 416, the content 418, the three-dimensional map view 420 and the character expression 422. In addition, the user database 202 communicates with the map database 208 associated with the map data 116 and the user profile 204.

The first user 102 may be associated with the first user profile 204A. The first character expression 422 associated with the first user profile 204A may be provided (e.g., using the character expression module 110 of FIG. 1). The first display view 402 may be generated to include the three-dimensional map view 420 embodied by the community network 200, the first character expression 422, and the first user profile 204A represented at a location in the three-dimensional map view 420 associated with the specific geographic location 206 of the first user profile 204A. The other user profiles 204B adjacent to the first user profile 204A may be represented simultaneously in the three-dimensional map view 420. The character expression tools 406 may be provided (e.g., through the character expression tool module 304 of FIG. 3) to customize the first character expression 422. The elements 408 may be provided (e.g., using the commerce transaction module 308 of FIG. 3) as the part of the commerce transaction 424 and the commerce transaction 424 may be enabled via the user profile 204.

Figure 5:
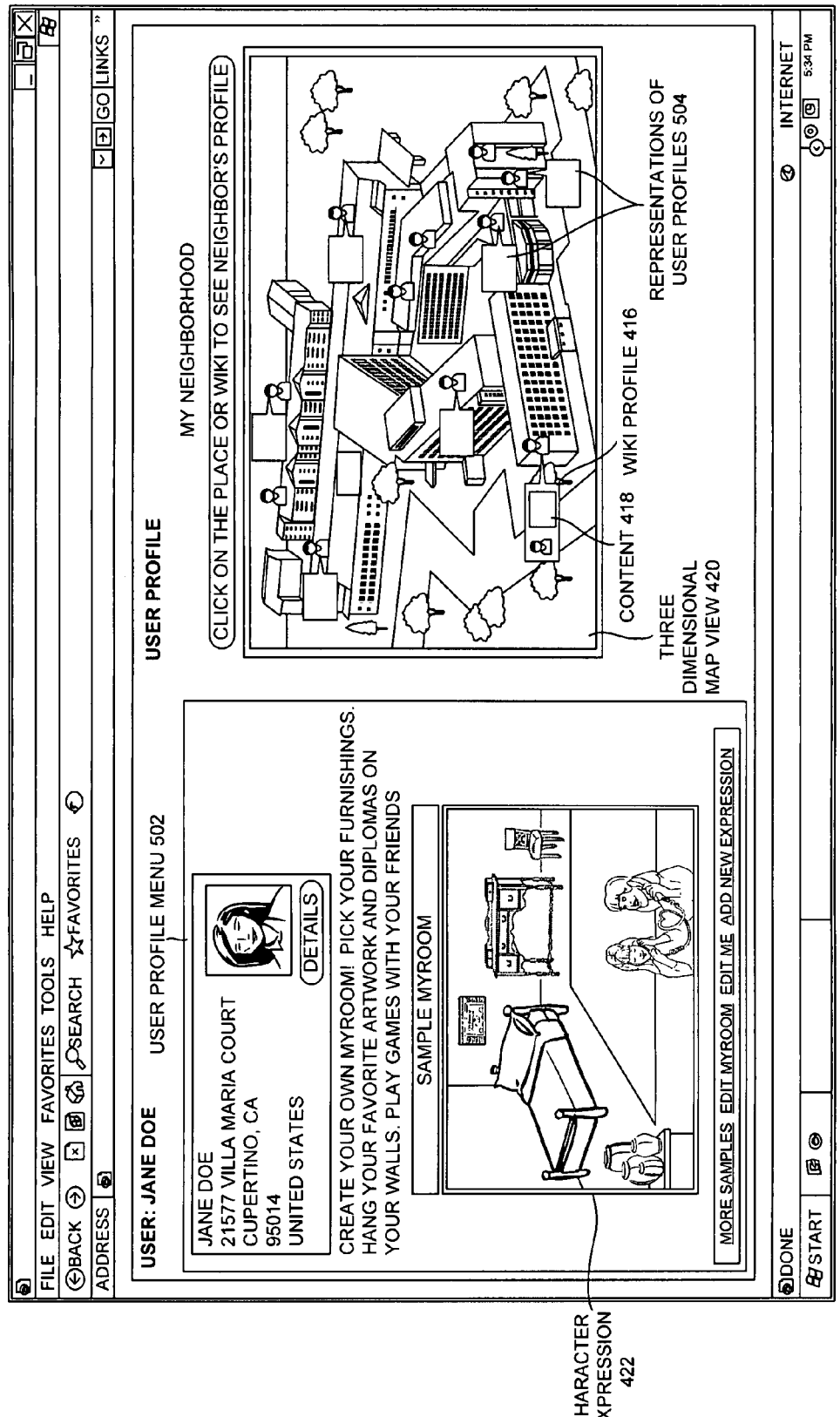
FIG. 5 is a user interface view of generating a character expression for an indoor space, according to one embodiment.

FIG. 5 is a user interface view 500 of generating a character expression 422 for an indoor space, according to one embodiment. Particularly, FIG. 5 illustrates the wiki profile 416, the content 418, the three-dimensional map view 420, the character expression 422, a user profile menu option 502 and representations of user profiles 504, according to one embodiment.

The user profile menu option 502 may display details (e.g., user name, address data, character expressions 422, etc.) of a user 102 associated with a user profile 204 of the community network 200. The user profile menu option 502 may enable the user 102 to create, edit, and/or modify a character expression 422 associated with the indoor space of the user profile 204. The representations of user profiles 504 may represent the user profiles 204 and wiki profiles 416 in the three-dimensional map view 420 in the geo-spatial environment 100.

In the example embodiment illustrated in FIG. 5, the user interface view 500 displays a profile of a user 102 (e.g., Jane Doe). The three-dimensional map view 420 displays the wiki profile 416, the content 418 associated with the wiki profile 416 and the representations of user profiles 504. In addition, the user interface view 500 may enable the user 102 to edit the wiki profile 416 associated with neighbors in a neighborhood.

Figure 6:
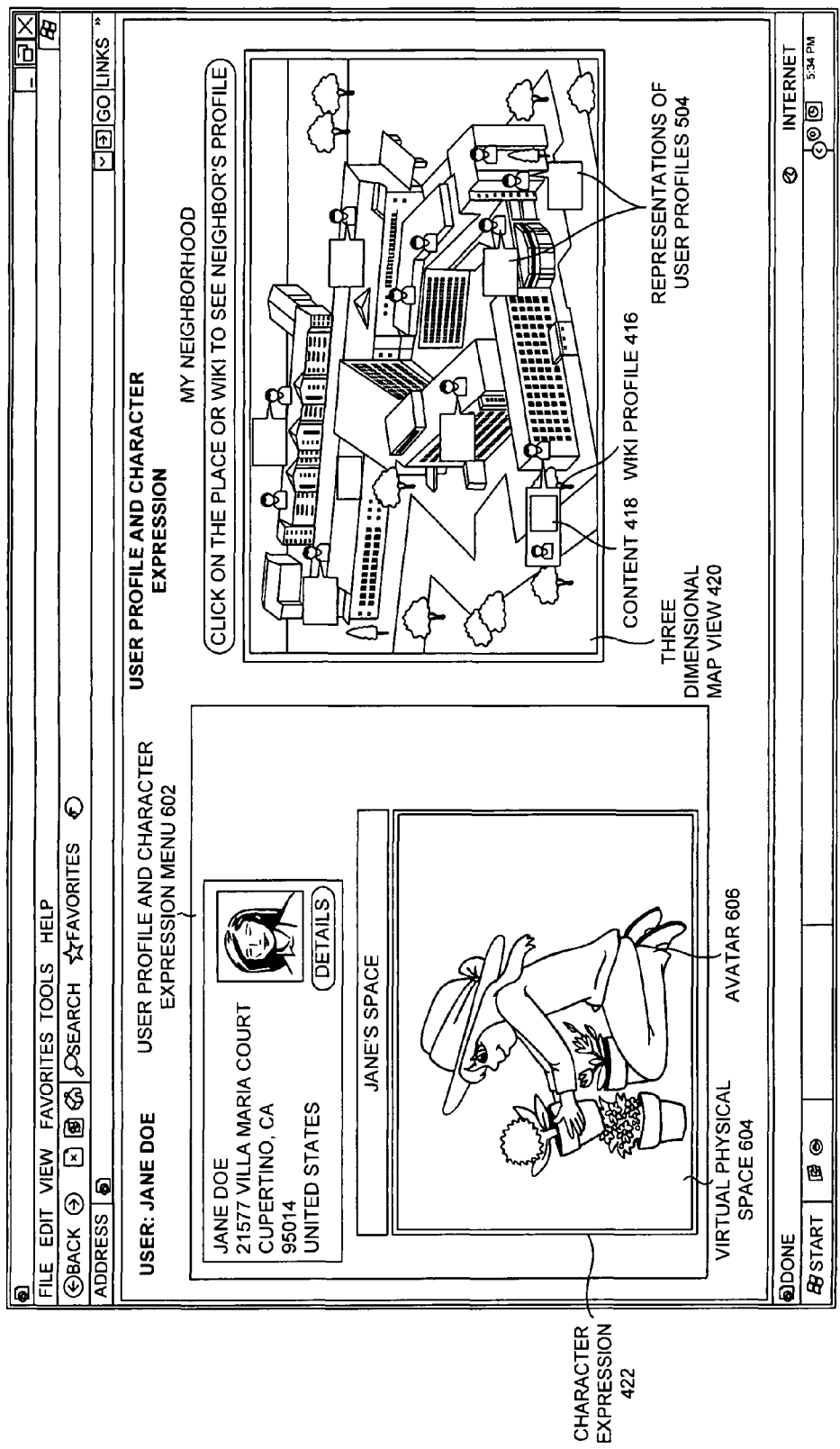
FIG. 6 is a user interface view of generating a character expression for an outdoor space, according to one embodiment.

FIG. 6 is a user interface view 500 of generating a character expression 422 for an outdoor space, according to one embodiment. Particularly, FIG. 6 illustrates the wiki profile 416, the content 418, the three-dimensional map view 420, the character expression 422, the representations of user profiles 504, a user profile and character expression menu option 602, a virtual physical space 604 and an avatar 606, according to one embodiment.

The user profile and character expression menu option 602 may display details (e.g., user name, address data, character expression 422, avatar 606, etc.) of the user 102 associated with the specific geographic location 206 in the geo-spatial environment 100. The virtual physical space 604 may represent a virtual view environment of the outdoor space associated with a particular user profile 204. The avatar 606 may be a graphical representation of an individual in the virtual view environment.

In the example embodiment illustrated in FIG. 6, the user interface view 600 displays the profile of the user 102 (e.g., Jane Doe). The user interface view 600 may enable the user 102 to create, edit, and/or modify the character expression 422 associated with the virtual physical space (e.g., the outdoor space) of the user profile 204 using the user profile and character expression menu option 602. The three-dimensional map view 420 displays the wiki profile 416, the content 418 associated with the wiki profile 416 and the representations of user profiles 504. In addition, the user interface view 600 may permit the user 102 to edit content 418 of a profile associated with neighbors in the neighborhood.

Figure 7:
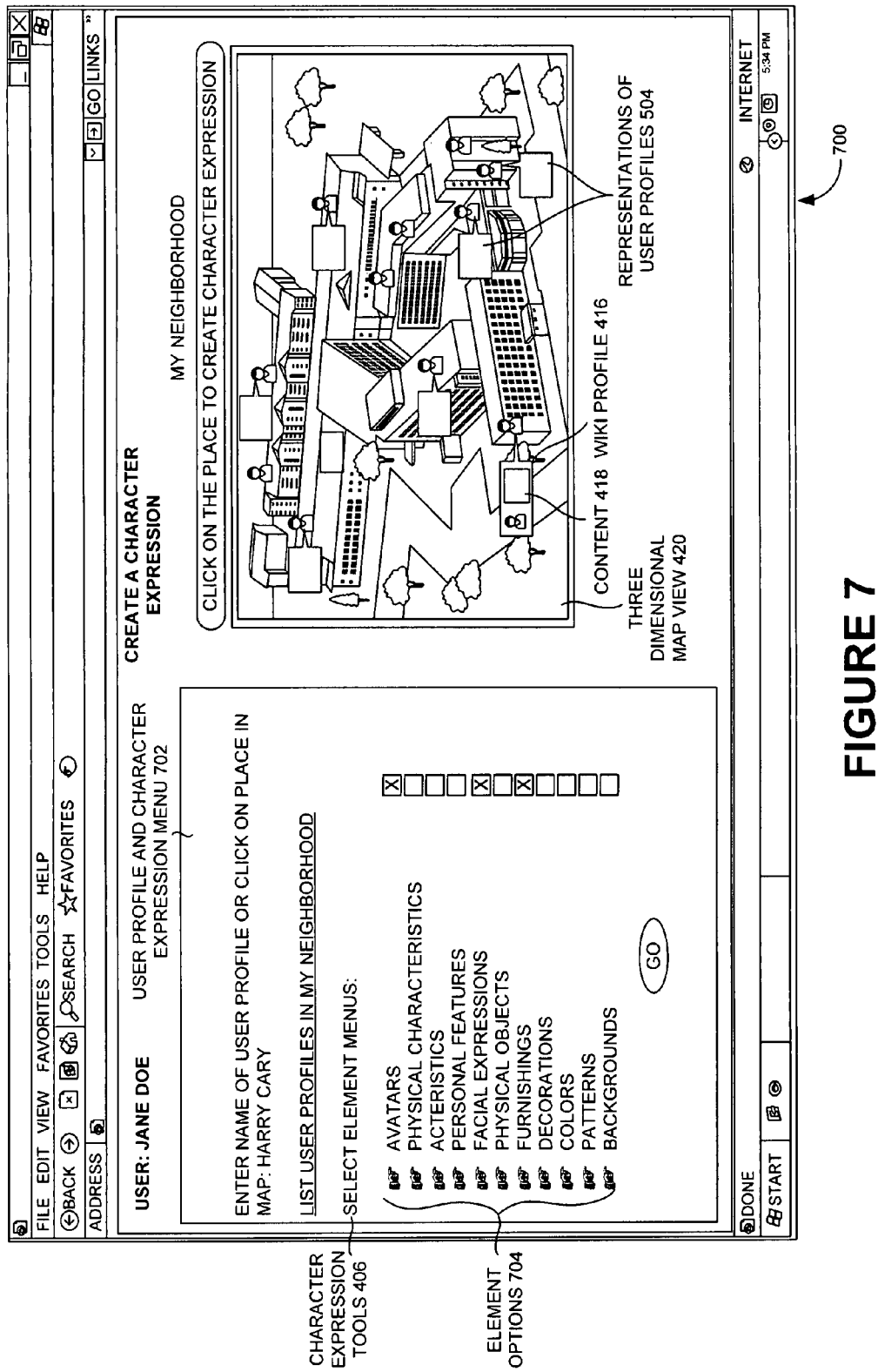
FIG. 7 is a user interface view showing elements for creating the character expression, according to one embodiment.

FIG. 7 is a user interface view 700 showing elements 408 for creating the character expression 422, according to one embodiment. Particularly, FIG. 7 illustrates the character expression tools 406, the element options 704, the wiki profile 416, the content 418, the three-dimensional map view 420, the representations of user profiles 504 and a user profile and character expression menu option 702, according to one embodiment.

The user profile and character expression menu option 702 may enable the user 102 to create the character expression 422 to the represent the physical space and the avatar 606 using the character expression tools 406 and/or the elements 408. The element options 704 may enable the users 102 to create the character expression 422 associated with the user profiles 204 using the elements 408.

In the example embodiment illustrated in FIG. 7, the user profile and character expression menu option 702 displays a list of the user profiles 204 in the neighborhood along with the element options 704. The user interface view may enable the user 102 (e.g., Jane Doe) to create the character expression 422 by selecting the elements 408 from the elements menu item. In addition, the user 102 can explore the three-dimensional map view 420 which displays the user profiles 204 and the wiki profile 416 in the neighborhood.

Figure 8:
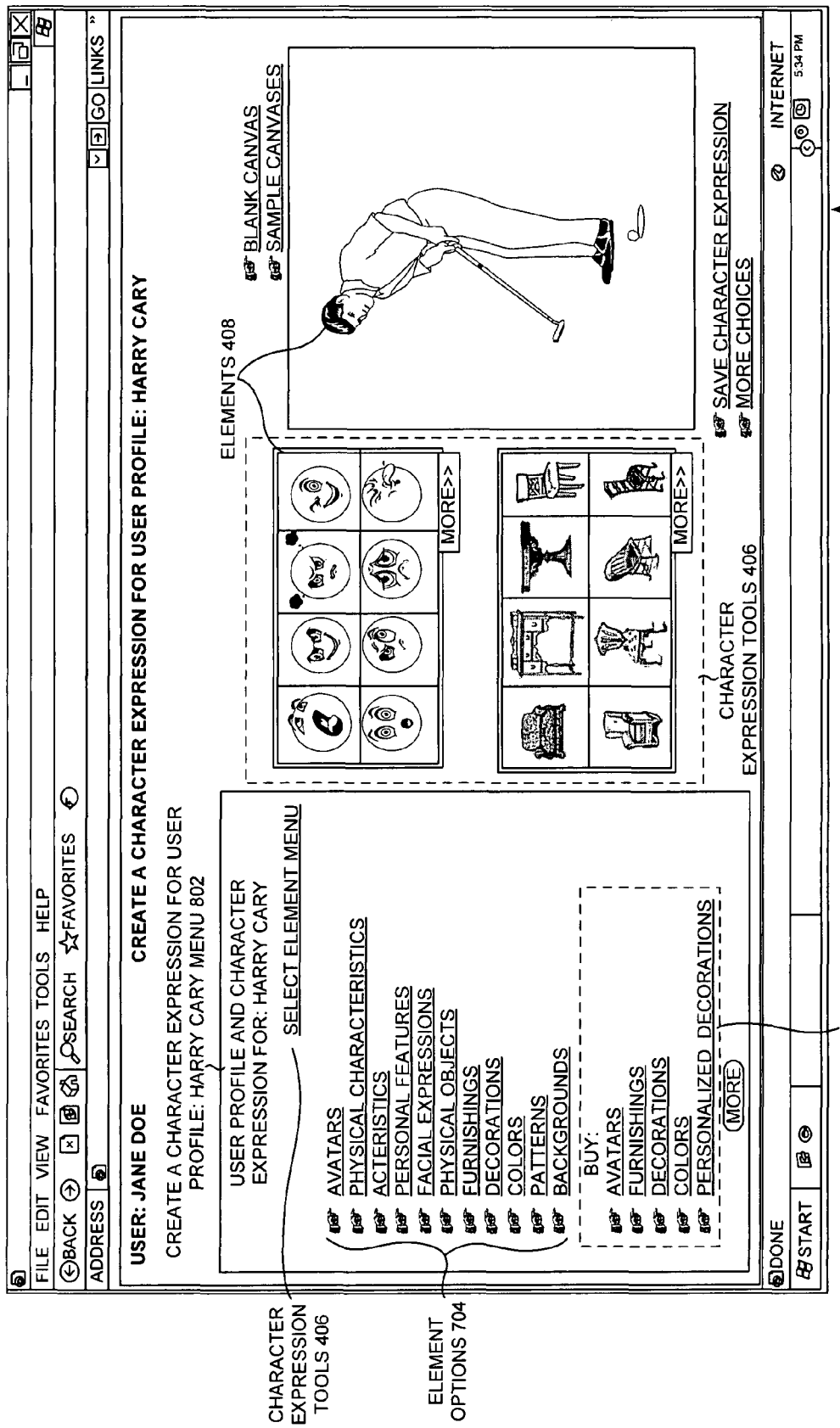
FIG. 8 is a user interface view of creating the character expression associated with the user profile, according to one embodiment.

FIG. 8 is a user interface view 800 of creating the character expression 422 associated with the user profile 204, according to one embodiment. Particularly, FIG. 8 illustrates the character expression tools 406, the element options 704, the commerce transaction 424 and a create a character expression for user profile menu option 802 (e.g., for "Harry Cary," as illustrated in FIG. 8), according to one embodiment.

The create a character expression for user profile menu option 802 may enable the user 102 to create the character expression 422 to the represent the physical space and the avatar 606 (e.g., for "Harry Cary") using the character expression tools 406.

In the example embodiment illustrated in FIG. 8, the create a character expression for user profile menu option 802 displays a list of the elements 408 in a group through which the user 102 (e.g., Jane Doe) can select any kind of elements 408 (e.g., avatars, physical objects, facial expression, etc.) from "select elements menu" for creating the character expression 422. The user interface view may also provide the user 102 a choice to select the avatars (e.g., the avatar 606 of FIG. 6), the physical characteristics, the personal features, the facial expression, the physical objects, the furnishing, the decorations, the colors, the patterns, the background etc. from the free elements 408 shown under the "show more free" menu item.

The create a character expression for user profile menu option 802 may also include elements 408 which are a part of a commerce transaction 424 where the users 102 may have the choice to select from pay-for elements 408 (e.g., avatars, furnishings, decorations, personalized decorations etc.) shown under the "buy" menu item. The facial expressions link of the character expression tools 406 displays a variety of facial expressions (e.g., happy, surprised, bored, sad, etc.) used to create the character expression 422. In addition, furnishing link of the character expression tools 406 displays a variety of elements 408 of furniture which the user 102 (e.g., Jane Doe) can utilize to decorate Harry Cary's physical space (e.g., indoor space, outdoor space, etc.).

Figure 9:
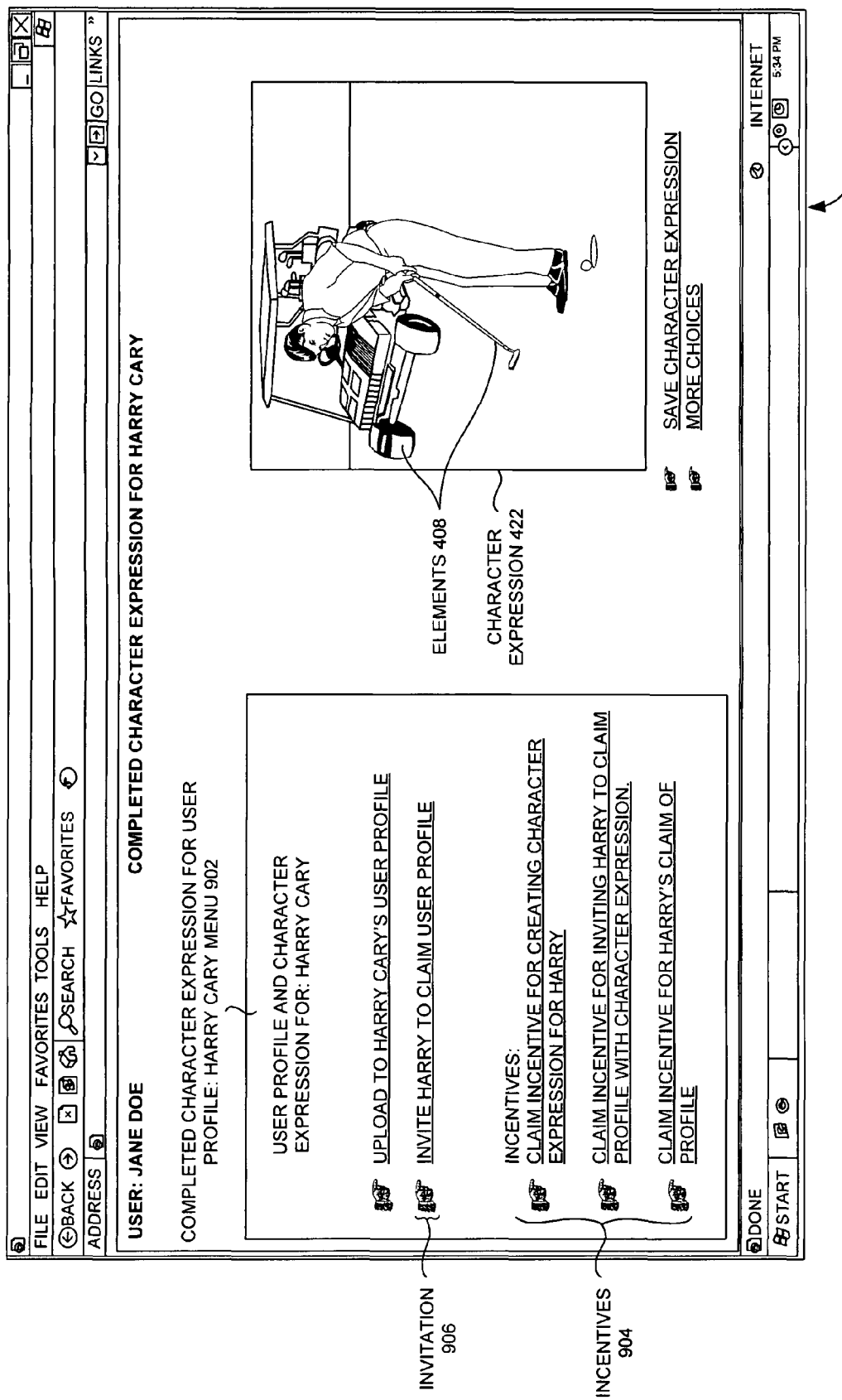
FIG. 9 is a user interface view displaying completed character expression associated with the user profile, according to one embodiment.

FIG. 9 is a user interface view 900 displaying the completed character expression 422 associated with the user profile 204, according to one embodiment. Particularly, FIG. 9 illustrates the elements 408, the character expression 422, a completed character expression for user profile menu option 902, incentives option 904 and an invitation option 906, according to one embodiment.

The completed character expression for user profile menu option 902 may display the user profile 204 and the completed character expression of another user 102 created by the user 102 of the geo-spatial environment 100. The incentives option 904 may provide the user 102 different levels of incentives 410 (e.g., the first level incentive, the second level incentive, the third level incentive, etc.) for creating the character expression 422, inviting others to claim the profile associated with character expression 422 and when the profile associated with the character expression 422 is claimed by the owner of the profile. The invitation option 906 may enable the user 102 to invite other user 102 associated with the profile to claim the user profile 204.

In the example embodiment illustrated in FIG. 9, the user interface view 900 displays the completed character expression 422 associated with another user profile 204 (e.g., Harry Cary) created by the user 102 (e.g., Jane Doe). The completed character expression for user profile menu option 902 displays the upload option, the invitation option 906 and/or the incentives option 904.

In addition, an upload option enables the user 102 (e.g., Jane Doe) to upload the content 418 to the user profile 204 of the user 102 (e.g., Harry Cary) associated with the character expression 422. The user interface view 900 may enable the user 102 to invite the other user 102 (e.g., Harry Cary) to claim the profile. The character expression 422 displays the elements 408 which may be used in decoration of the physical space (e.g., indoor space, outdoor space, etc.).

Figure 10:
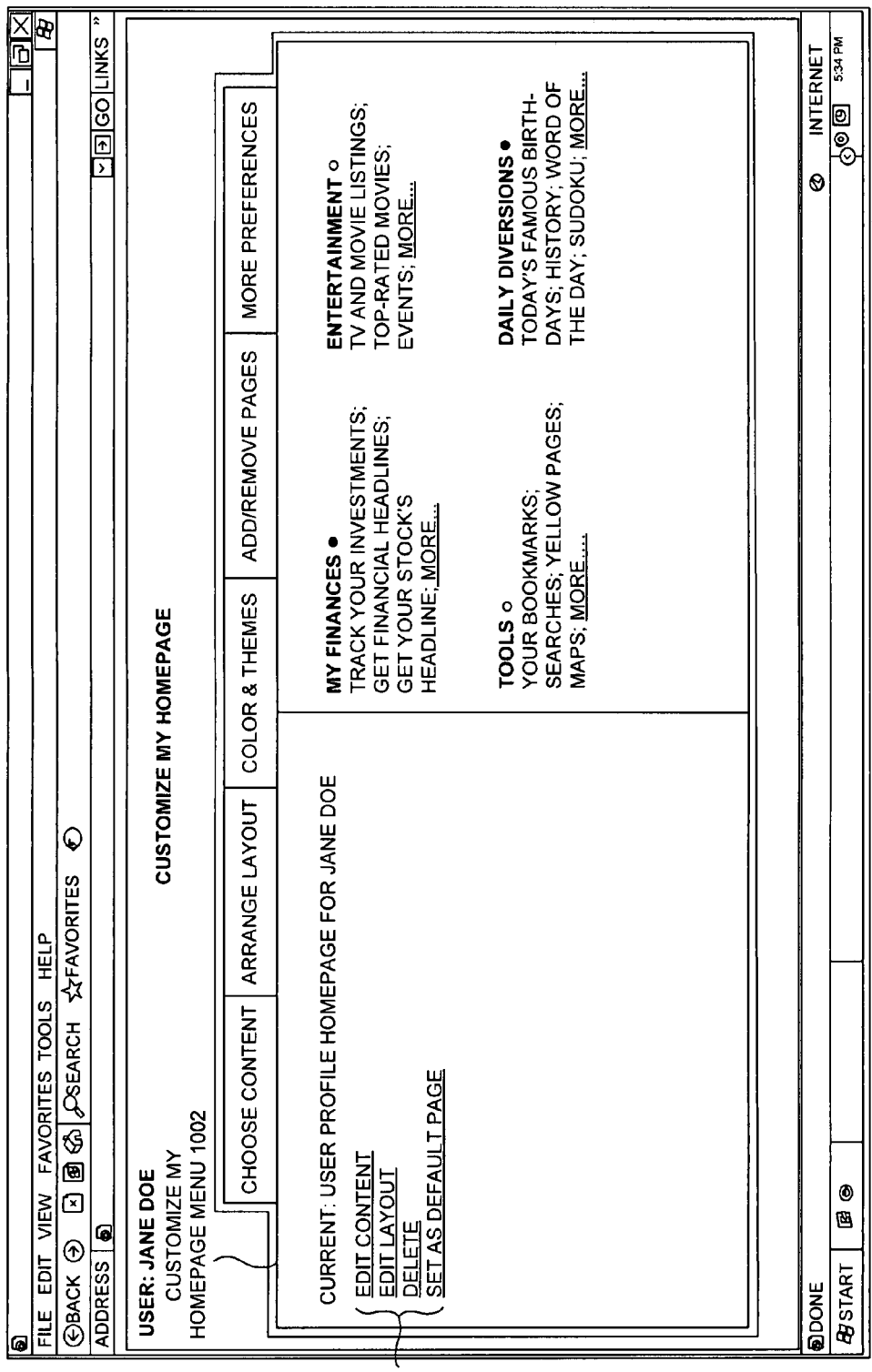
FIG. 10 is a user interface view of customizing a homepage, according to one embodiment.

FIG. 10 is a user interface view 1000 of customizing the homepage 404, according to one embodiment. Particularly, FIG. 10 illustrates the homepage tools 414 and a customize my homepage menu block 1002, according to one embodiment. The customize my homepage menu block 1002 may enable the user 102 to customize the homepage 404 by selecting options such as edit content, edit layout, delete, set as default page available in the list.

In the example embodiment illustrated in FIG. 10, the user 102 (e.g., Jane Doe) may customize associated homepage 404 by selecting the desired options available in the list. The customize my homepage menu block 1002 displays edit content option, edit layout option, delete option, and/or set as default page option. The customize my homepage menu block 1002 also displays a quick start pages option that includes my finance, entertainment, tools, and/or daily diversions customized by the user 102.

Figure 11:
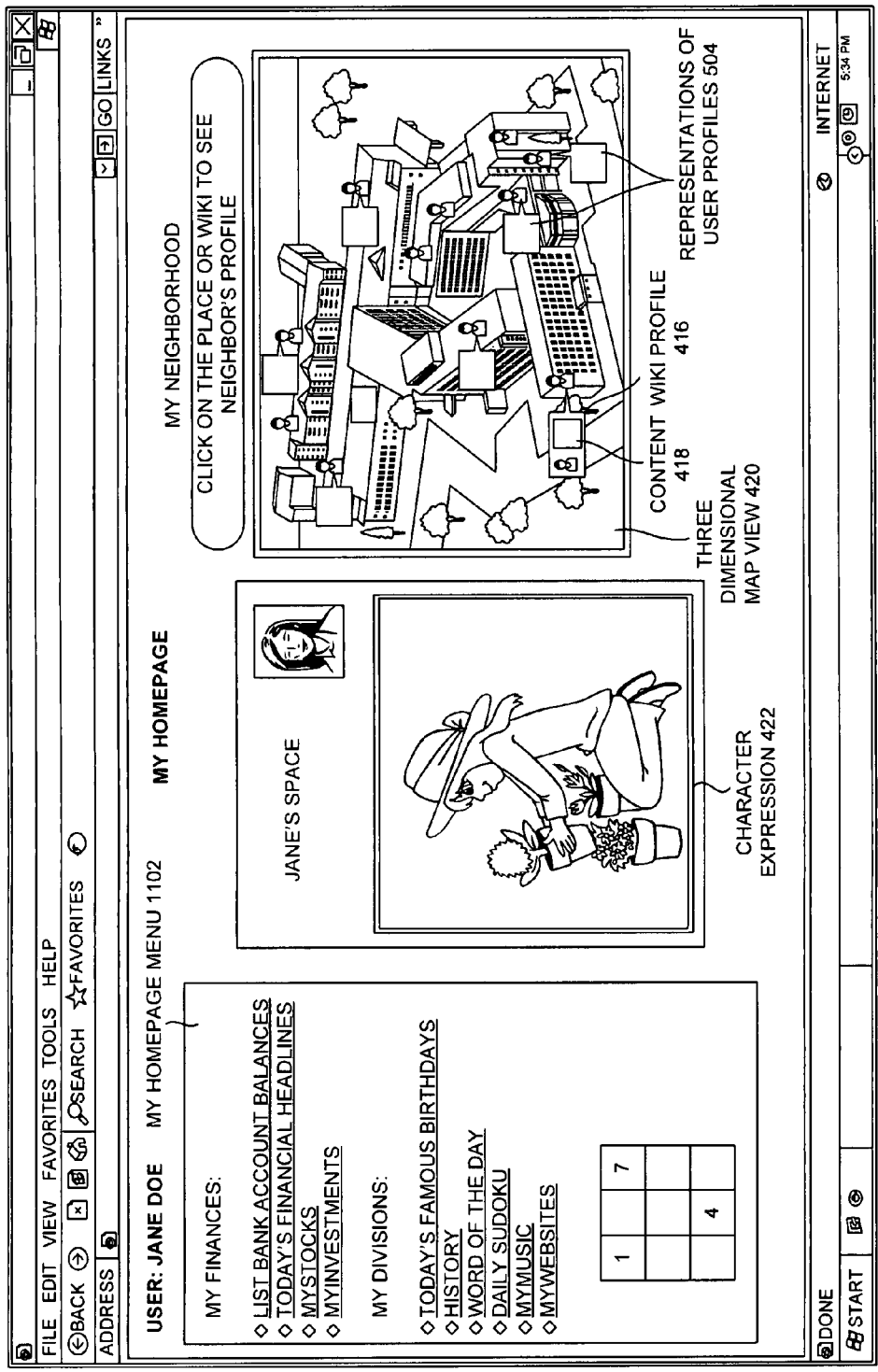
FIG. 11 is a user interface view showing a homepage of a user associated with a user profile, according to one embodiment.

FIG. 11 is a user interface view 1100 showing the homepage 404 of a user 102 associated with a user profile 204, according to one embodiment. Particularly, FIG. 11 illustrates the wiki profile 416, the content 418, the three-dimensional map view 420, the character expression 422, the representations of user profiles 504 and a my homepage menu option 1102, according to one embodiment.

The my homepage menu option 1102 may display the list of items linked through customized menu options. In the example embodiment illustrated in FIG. 11, the user interface view 1100 displays my homepage menu option 1102, the character expression 422, and the three-dimensional map view 420 including the representation of user profiles 504, the content 418, and the wiki profile 416. The customized homepage menu option displays "My Finances", "My Divisions" options that are customized by the user 102 (e.g., Jane Doe). For example, the customized menu option may display a list bank account balance link, a my stocks link and/or a my investments link, etc.

The my finances link available in the my homepage menu option 1102 may enable the user 102 to select the various options such as list bank account balances, today's financial headlines, my stocks, my investments etc. available in the list. In addition, my divisions link available in the my homepage menu option 1102 may enable the user 102 to select the various available options such as today's famous birthdays history, word of the day, daily sudoku, mymusic, mywebsites, etc.

Figure 12:
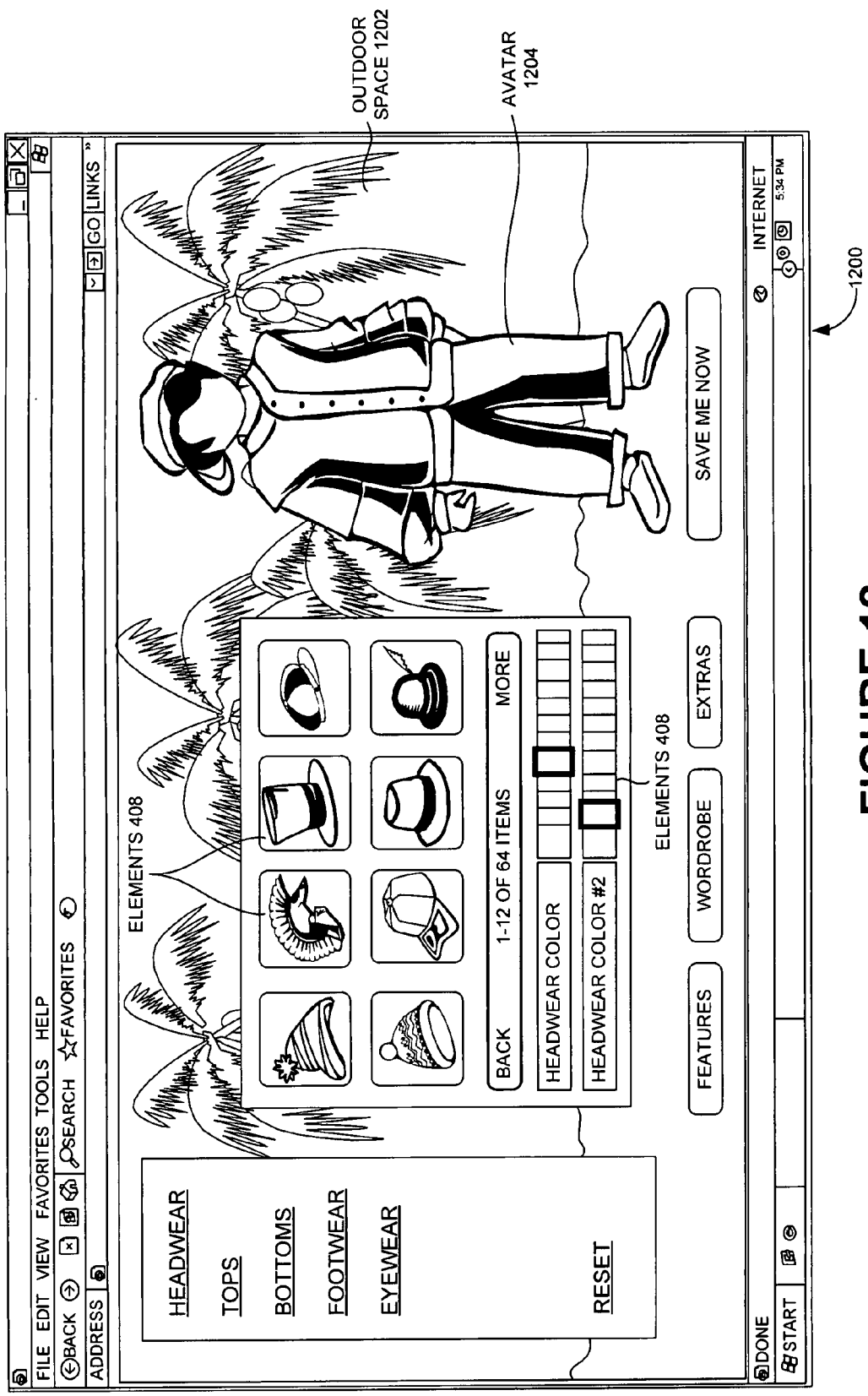
FIG. 12 is a user interface view displaying a representation of an avatar and an outdoor space in the geo-spatial environment, according to one embodiment.

FIG. 12 is a user interface view 1200 displaying a representation of an outdoor space 1202 and an avatar 1204 in the geo-spatial environment 100, according to one embodiment. Particularly, FIG. 12 illustrates the elements 408, the outdoor space 1202 and the avatar 1204, according to one embodiment.

The outdoor space 1202 may represent a character expression (e.g., the character expression 422 of FIG. 4) of the three-dimensional map view 420 of an outside structure (e.g., garden, park, outdoor venue, etc.) associated with the user profile (e.g., the first user profile 204A of FIG. 4). The avatar 1204 may be a graphical representation of an individual in the virtual view environment.

In the example embodiment illustrated in FIG. 12, the user interface view 1200 represents the outdoor space 1202 and the avatar 1204 in the geo-spatial environment 100. The user interface view 1200 also displays various elements 408 (e.g., headwear, tops, bottoms, footwear, eyewear, etc.), used to decorate the three-dimensional representation of the outdoor space 1202.

Figure 13:
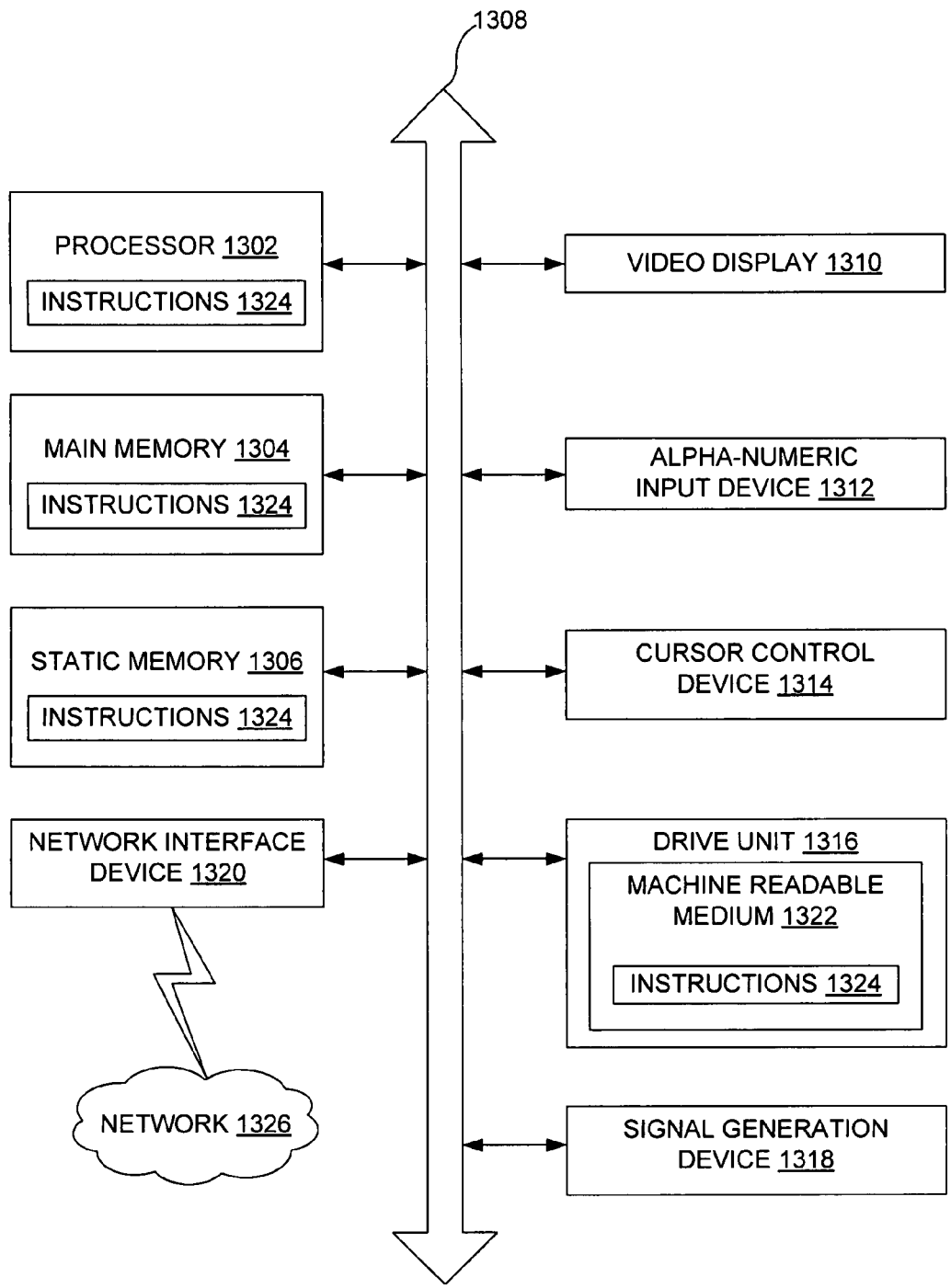
FIG. 13 is a diagrammatic system view of a data processing system in which any of the embodiments disclosed herein may be performed, according to one embodiment.

FIG. 13 is a diagrammatic system view 1300 of a data processing system in which any of the embodiments disclosed herein may be performed, according to one embodiment. Particularly, the diagrammatic system view 1300 of FIG. 13 illustrates a processor 1302, a main memory 1304, a static memory 1306, a bus 1308, a video display 1310, an alpha-numeric input device 1312, a cursor control device 1314, a drive unit 1316, a signal generation device 1318, a network interface device 1320, a machine readable medium 1322, instructions 1324 and a network 1326, according to one embodiment.

The diagrammatic system view 1300 may indicate a personal computer and/or a data processing system in which one or more operations disclosed herein may be performed. The processor 1302 may be a microprocessor, a state machine, an application-specific integrated circuit, a field programmable gate array, etc. (e.g., Intel® Pentium® processor). The main memory 1304 may be a dynamic random access memory and/or a primary memory of a computer system. The static memory 1306 may be a hard drive, a flash drive, and/or other memory information associated with the data processing system.

The bus 1308 may be an interconnection between various circuits and/or structures of the data processing system. The video display 1310 may provide graphical representation of information on the data processing system. The alpha-numeric input device 1312 may be a keypad, a keyboard and/or any other input device of text (e.g., a special device to aid the physically challenged). The cursor control device 1314 may be a pointing device such as a mouse.

The drive unit 1316 may be a hard drive, a storage system, and/or other longer term storage subsystem. The signal generation device 1318 may be a bios and/or a functional operating system of the data processing system. The network interface device 1320 may be a device that may perform interface functions such as code conversion, protocol conversion and/or buffering required for communication to and from the network 1326. The machine readable medium 1322 may provide instructions on which any of the methods disclosed herein may be performed. The instructions 1324 may provide source code and/or data code to the processor 1302 to enable any one/or more operations disclosed herein.

FIG. 14 is a table view displaying information associated with the user profiles 204 of the users 102, according to one embodiment. Particularly, FIG. 14 illustrates a users field 1402, a claimed profile field 1404, a character expression field 1406, a customized homepage field 1408 and an incentives field 1410, according to one embodiment.

The users field 1402 may display an identifier (e.g., name, username, unique key, etc.) referencing users 102 associated with the user profiles 204 in the geo-spatial environment 100. The claimed profile field 1404 may indicate whether a profile associated with the user 102 is claimed or not. The character expressions field 1406 may provide information on the users 102 (e.g., whether the character expressions 422 for the user profiles 204 are created or not). The customized homepage field 1408 may display the customization of a homepage status (e.g., customized or not customized) of the users 102. The incentives field 1410 may display a number rendering information about the incentives 410 obtained by the users 102.

In the example embodiment illustrated in FIG. 14, the users field 1402 displays "Jane Doe" in the first row, "Jim Slim" in the second row and "Harry Cary" in the third row of the users field column 1402. The claimed profile field 1404 displays "Yes" in the first row, indicating that Jane Doe has claimed his/her profile, "Yes" in the second row, indicating Jim Slim has claimed his/her profile and "No" in the third row, indicating the profile associated with Harry Cary is a wiki profile, in the claimed profile field column 1404. The character expressions field 1406 displays "No" in the first row, "No" in the second row, which indicates character expressions 422 are not created for the profiles associated with Jane Doe and Jim Slim and "Yes" in the third row, indicates that character expression 422 is created for the profile associated with Harry Cary in the character expressions field column 1406.

The customized homepage field 1408 displays "Yes" in the first row (e.g., indicating that Jane Doe has a customized homepage), "No" in the second row and "No" in the third row (e.g., indicating that the users Jim Slim and Harry Cary do not have customized homepages), in the customized homepage field column 1408. The incentives field 1410 displays "1" in the first row, which indicates one incentive is provided to Jane Doe, "0" in the second row and "0" in the third row, indicating that no incentives are provided to Jim Slim and Harry Cary, in the incentives field column 1410.

Figure 15A:
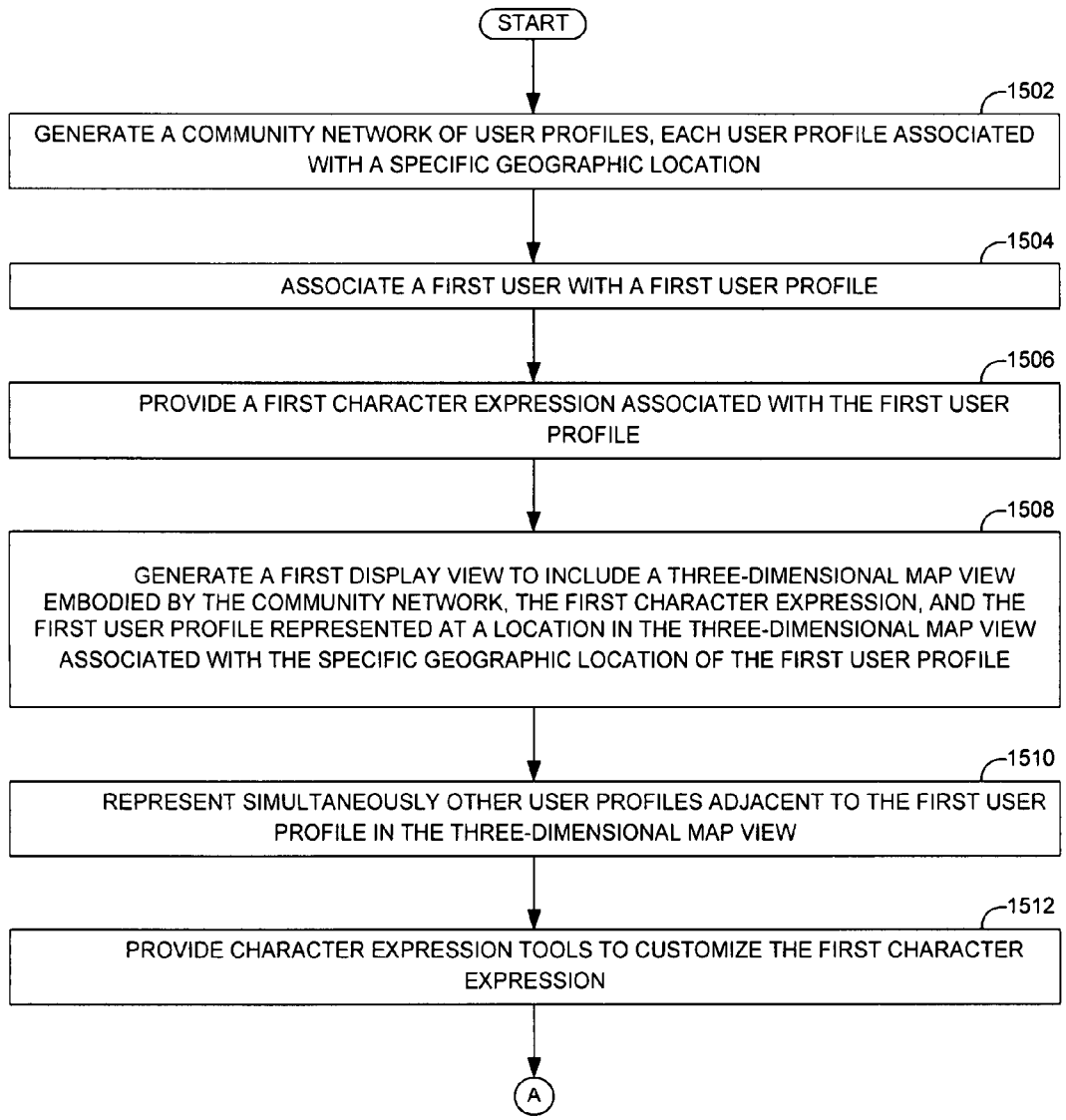
FIG. 15A is a process flow of generating the character expression associated with the user profile in the geo-spatial environment, according to one embodiment.

FIG. 15A is a process flow of generating a character expression (e.g., the character expression 422 of FIG. 4) associated with a user profile (e.g., the user profiles 204 of FIG. 2) in the geo-spatial environment 100, according to one embodiment. In operation 1502, a community network (e.g., the community network 200 of FIG. 2) of user profiles 204 may be generated, each user profile 204 associated with a specific geographic location 206 (e.g., using the community network module 106 of FIG. 1). In operation 1504, a first user (e.g., a user 102 of FIG. 1) may be associated with a first user profile 204A.

In operation 1506, a first character expression (e.g., the character expression 422 of FIG. 4) associated with the first user profile 204A may be provided (e.g., using the character expression module 110 of FIG. 1). In operation 1508, a first display view (e.g., the first display view 402 of FIG. 4) may be generated (e.g., using the display module 112 of FIG. 1) to include a three-dimensional map view (e.g., the three-dimensional map view 420 of FIG. 4) embodied by the community network 200, the first character expression 422, and the first user profile 204A represented at a location in the three-dimensional map view 420 associated with the specific geographic location 206 of the first user profile 204A. In operation 1510, other user profiles 204B may be simultaneously represented (e.g., through the map module 108 of FIG. 1) adjacent to the first user profile 204A in the three-dimensional map view 420. In operation 1512, character expression tools 406 to customize the first character expression 422 may be provided (e.g., through the character expression tool module 304 of FIG. 3).

Figure 15B:
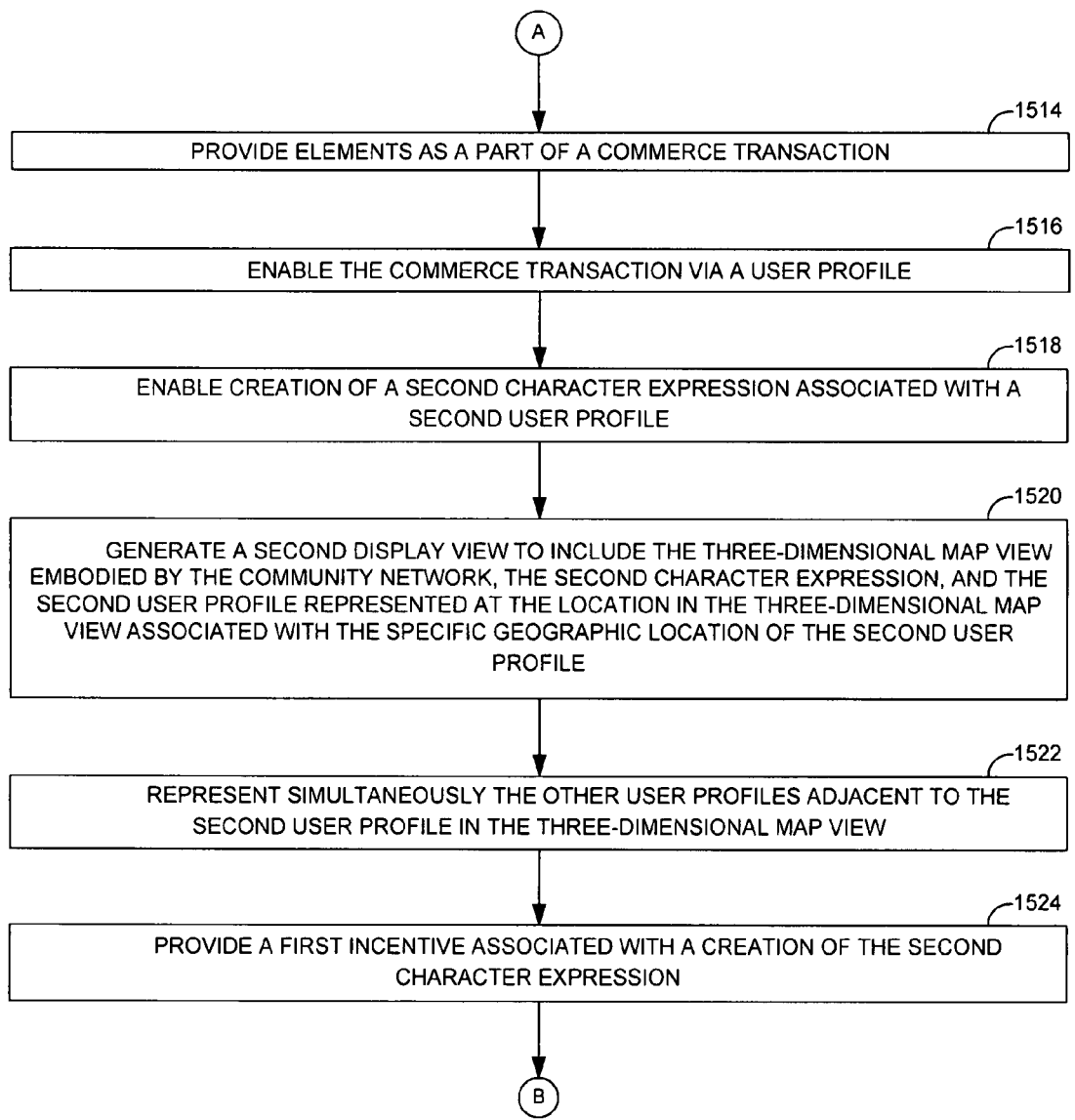
FIG. 15B is a continuation of the process flow of FIG. 15A, showing additional processes, according to one embodiment.

FIG. 15B is a continuation of the process flow of FIG. 15A, showing additional processes, according to one embodiment. In operation 1514, elements (e.g., the elements 408 of FIG. 4) may be provided (e.g., using the element module 306 of FIG. 3) as a part of a commerce transaction 424. In operation 1516, the commerce transaction 424 may be enabled (e.g., using the commerce transaction module 308 of FIG. 3) via a user profile 204. In operation 1518, creation of a second character expression 422 associated with a second user profile 204 may be enabled (e.g., using the incentive module 310 of FIG. 3).

In operation 1520, a second display view 402 may be generated (e.g., using the display module 112 of FIG. 1) to include a three-dimensional map view (e.g., the three-dimensional map view 420 of FIG. 4) embodied by the community network 200, the second character expression 422, and the second user profile 204 represented at the location in the three-dimensional map view 420 associated with the specific geographic location 206 of the second user profile 204. In operation 1522, other user profiles 204B adjacent to the second user profile 204 may be simultaneously represented (e.g., using the display module 112 of FIG. 1) in the three-dimensional map view 420. In operation 1524, a first incentive associated with creation of the second character expression 422 may be provided (e.g., using the incentive module 310 of FIG. 3).

Figure 15C:
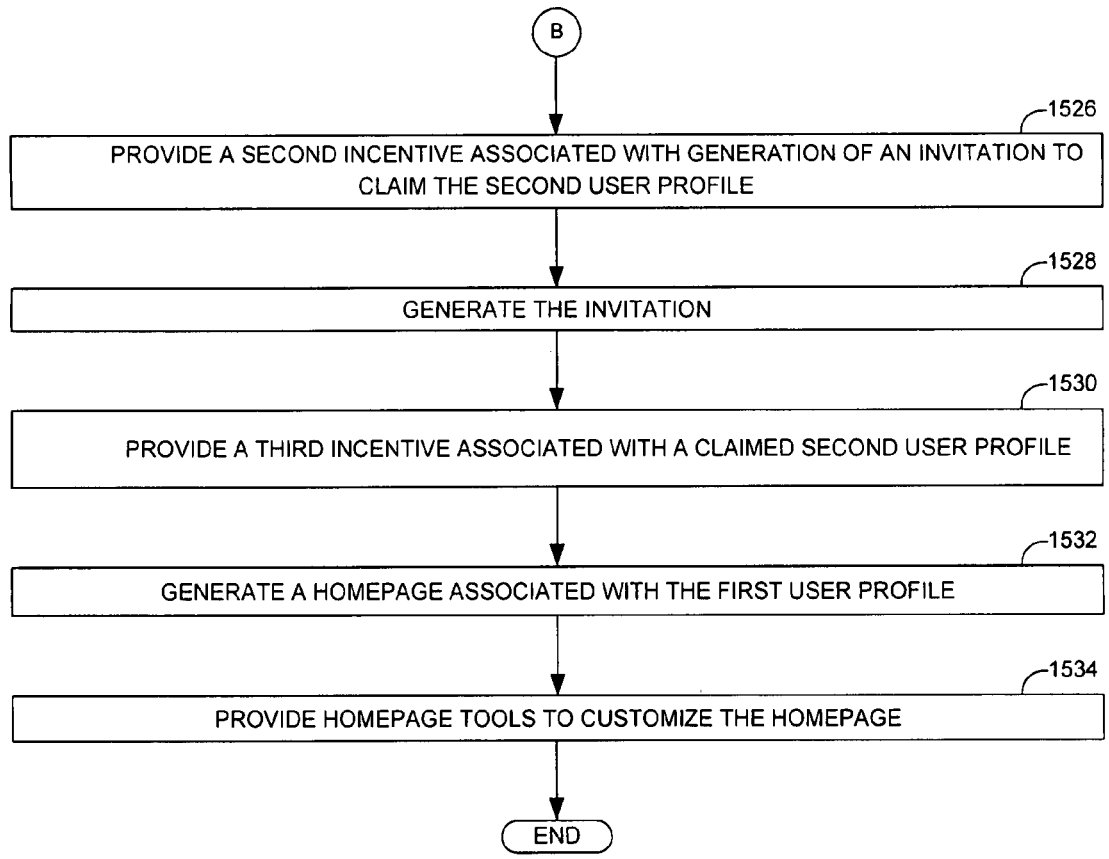
FIG. 15C is a continuation of the process flow of FIG. 15B, showing additional processes, according to one embodiment.

FIG. 15C is a continuation of the process flow of FIG. 15B, showing additional processes, according to one embodiment. In operation 1526, a second incentive associated with generation of an invitation to claim the second user profile 204 may be provided (e.g., using the incentive module 310 of FIG. 3). In operation 1528, the invitation may be generated (e.g., through the invitation option 906 of FIG. 9). In operation 1530, a third incentive associated with a claimed second user profile 204 may be provided. In operation 1532, a homepage (e.g., the homepage 404 of FIG. 4) associated with the first user profile 204A may be generated (e.g., using the homepage module 312 of FIG. 3). In operation 1534, homepage tools 414 to customize the homepage 404 may be provided (e.g., using the homepage tool module 312A of FIG. 3).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, the various electrical structure and methods may be embodied using transistors, logic gates, and electrical circuits (e.g., Application Specific Integrated circuitry (ASIC) and/or in Digital Signal Processor (DSP) circuitry). For example, the community network module 106, the map module 108, the character expression module 110, the display module 112, the wiki profile module 302, the append module 302A, the character expression tool module 304, the element module 306, the commerce transaction module 308, the incentive module 310, the homepage module 312 and the homepage tool module 312A, and other modules of FIGS. 1-15 may be enabled using a community network circuit, a map circuit, a character expression circuit, a display circuit, a wiki profile circuit, an append circuit, a character expression tool circuit, an element circuit, a commerce transaction circuit, an incentive circuit, a homepage circuit and a homepage tool circuit, and other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method, comprising:
    generating a community network of user profiles, each user profile of the user profiles associated with a specific geographic location;
    associating a first user with a first user profile of the user profiles; providing a first character expression associated with the first user profile of the user profiles;
    generating a first display view to include a three-dimensional map view embodied by the community network, the first character expression, and the first user profile of the user profiles represented at a location in the three-dimensional map view associated with the specific geographic location of the first user profile of the user profiles;
    simultaneously representing other user profiles adjacent to the first user profile of the user profiles in the three-dimensional map view; and
    generating in the first display view a wiki profile associated with a user profile of the user profiles.

2. The method of claim 1, wherein the providing the first character expression associated with the first user profile of the user profiles comprises:
    providing at least one of a representation of a physical space and an avatar; and enabling decoration of the representation as an expression of an individual.

3. The method of claim 2, wherein the representation of a physical space is selected from a group comprising a representation of an outdoor space, and a representation of an indoor space.

4. The method of claim 3, wherein the representation of an indoor space comprises a three-dimensional representation of a room.

5. The method of claim 4, wherein the enabling decoration of the three-dimensional representation of a room as an expression of an individual comprises enabling decoration with at least one representation of an element selected from a group comprising a physical object, a color, a pattern, a background, a furnishing, a person, an avatar, artwork, a diploma, a work accomplishment document, a trophy, a poster, a picture, and a photograph.

6. The method of claim 3, wherein the representation of an outdoor space comprises a three-dimensional representation of at least one of a garden, a park, and an outdoor venue.

7. The method of claim 6, wherein the enabling decoration of the three-dimensional representation of the at least one of a garden, a park, and an outdoor venue comprises enabling decoration with at least one representation of an element selected from a group comprising a physical object, a color, a pattern, a background, a flower, a plant, a tree, a sky, a cloud, a sun, a rainbow, a body of water, a person, an avatar, an animal, a physical structure, and a transportation vehicle.

8. The method of claim 2, wherein the enabling decoration of the avatar comprises enabling decoration with at least one element selected from a group comprising a physical characteristic, a personal feature, a facial expression, a physical pose, a clothing item, and an accessory.

9. The method of claim 1, further comprising providing character expression tools to customize the first character expression.

10. The method of claim 9, further comprising:
    providing elements as a part of a commerce transaction; and
    enabling the commerce transaction via a user profile of the user profiles.

11. The method of claim 1, further comprising:
    enabling creation of a second character expression associated with a second user profile of the user profiles;
    generating a second display view to include a three-dimensional map view embodied by the community network, the second character expression, and the second user profile of the user profiles represented at a location in the three-dimensional map view associated with the specific geographic location of the second user profile of the user profiles; and
    simultaneously representing other user profiles adjacent to the second user profile of the user profiles in the three-dimensional map view.

12. The method of claim 11, wherein the second character expression is displayed in conjunction with a wiki profile.

13. The method of claim 11, further comprising providing a first incentive associated with creation of the second character expression.

14. The method of claim 11, further comprising:
    providing a second incentive associated with generation of an invitation to claim the second user profile; and
    generating the invitation.

15. The method of claim 11, further comprising providing a third incentive associated with a claimed second user profile of the user profiles.

16. The method of claim 1, further comprising generating a homepage associated with the first user profile of the user profiles.

17. The method of claim 16, further comprising providing homepage tools to customize the homepage.

18. The method of claim 1 in a form of a machine-readable medium embodying a set of instructions that, when executed by a machine, causes the machine to perform the method of claim 1.

19. A system, comprising:
a geo-spatial environment;
a community network module of the geo-spatial environment, to include user profiles, each user profile of the user profiles to include a specific geographic location;
a character expression module of the geo-spatial environment to generate character expressions associated with the user profiles;
a map module of the geo-spatial environment to include map data which serves as a basis to render a three-dimensional map view in the geo-spatial environment which identifies at least some residences, businesses, and civic structures having specific geographic locations;
a display module of the geo-spatial environment to generate a display view of the three-dimensional map view embodied by the community network, a first user profile of the user profiles, and a first character expression of the character expressions associated with the first user profile of the user profiles represented at a location in the three-dimensional map view associated with the specific geographic location of the first user profile of the user profiles, and simultaneously to represent other user profiles adjacent to the first user profile of the user profiles in the three-dimensional map view;
a wiki profile module of the geo-spatial environment to generate in the display view a wiki profile associated with a user profile of the user profiles; and a processor for executing the community network module, the character expression module, the map module, the display module and the wiki profile module.

20. The system of claim 19, further comprising an append module to generate, with the at least one wiki profile, content associated with the at least one wiki profile.

21. The system of claim 19, further comprising:
an incentive module of the geo-spatial environment to enable creation of a second character expression associated with a second user profile of the user profiles, display of the second character expression in conjunction with a wiki profile associated with the second user profile, and incentives associated with at least one of the creation of the second character expression, generation of an invitation to claim the second user profile of the user profiles, and a claim of the second user profile of the user profiles.

22. The system of claim 19, further comprising a character expression tool module of the geo-spatial environment to customize a character expression of the character expressions associated with a user profile of the user profiles.

23. The system of claim 19, further comprising an element module of the geo-spatial environment to provide elements to customize the character expression of the character expressions.

24. The system of claim 23, wherein the character expression further comprises at least one of a representation of an indoor space, a representation of an outdoor space, and an avatar.

25. The system of claim 24, wherein the representation of the indoor space comprises a three-dimensional representation of a room.

26. The system of claim 25, wherein the elements to customize the three-dimensional representation of a room are selected from a group comprising a physical object, a color, a pattern, a background, a furnishing, a person, an avatar, artwork, a diploma, a work accomplishment document, a trophy, a poster, a picture, and a photograph.

27. The system of claim 24, wherein the representation of the outdoor space comprises a three-dimensional representation of at least one of a garden, a park, and an outdoor venue.

28. The system of claim 27, wherein the elements to customize the three-dimensional representation of the at least one of a garden, a park, and an outdoor venue are selected from a group comprising a physical object, a color, a pattern, a background, a flower, a plant, a tree, a sky, a cloud, a sun, a rainbow, a body of water, a person, an avatar, an animal, a physical structure, and a transportation vehicle.

29. The system of claim 24, wherein the elements to customize the avatar are selected from a group comprising a physical characteristic, a personal feature, a facial expression, a physical pose, a clothing item, and an accessory.

30. The system of claim 19, further comprising a commerce transaction module of the geo-spatial environment to generate a commerce transaction associated with a character expression of the character expressions.

31. The system of claim 30, wherein the commerce transaction further comprises an online payment transaction to purchase a use of elements in the character expression.

32. The system of claim 19, further comprising a homepage module of the geo-spatial environment to generate a homepage associated with the first user profile of the user profiles.

33. The system of claim 32, further comprising a homepage tool module to provide homepage tools to customize the homepage.

34. A geo-spatial environment, comprising:
a first instruction set to enable a community network, to include a map database associated with map data and a user database associated with user profiles, each user profile of the user profiles associated a specific geographic location identifiable in the map data;
a second instruction set integrated with the first instruction set to generate a character expression associated with a first user profile of the user profiles; and
a third instruction set integrated with the first instruction set and the second instruction set to display a three-dimensional map view embodied by the community network, the first user profile of the user profiles, the character expression, and simultaneously to represent other user profiles adjacent to the first user profile of the user profiles in the three-dimensional map view, wherein the first user profile is displayed at a location in the three-dimensional map view associated with the specific geographic location of the first user profile, and further wherein a wiki profile associated with the first user profile is displayed in the three-dimensional map view; and a processor for executing the first, second and third instructions.

35. The geo-spatial environment of claim 34, further comprising a fourth instruction set integrated with the first instruction set and the second instruction set and the third instruction set to provide elements and character expression tools to customize character expressions.

36. The geo-spatial environment of claim 34, further comprising a fifth instruction set to enable creation and customization of a homepage associated with a user profile of the user profiles.

* * * * *